(12) United States Patent
Sugano et al.

(10) Patent No.: US 10,636,384 B2
(45) Date of Patent: Apr. 28, 2020

(54) IMAGE PROCESSING APPARATUS AND IMAGE PROCESSING METHOD

(71) Applicant: SONY CORPORATION, Tokyo (JP)

(72) Inventors: Hisako Sugano, Kanagawa (JP); Junichiro Enoki, Kanagawa (JP)

(73) Assignee: SONY CORPORATION, Tokyo (JP)

(*) Notice: Subject to any disclaimer, the term of this patent is extended or adjusted under 35 U.S.C. 154(b) by 148 days.

(21) Appl. No.: 15/129,023

(22) PCT Filed: Feb. 16, 2015

(86) PCT No.: PCT/JP2015/000692
§ 371 (c)(1),
(2) Date: Sep. 26, 2016

(87) PCT Pub. No.: WO2015/151387
PCT Pub. Date: Oct. 8, 2015

(65) Prior Publication Data
US 2017/0116960 A1    Apr. 27, 2017

(30) Foreign Application Priority Data
Apr. 4, 2014   (JP) .................... 2014-077837

(51) Int. Cl.
*G09G 5/10*    (2006.01)
*G09G 3/34*    (2006.01)
(Continued)

(52) U.S. Cl.
CPC ............ *G09G 5/10* (2013.01); *G06F 1/1686* (2013.01); *G06F 3/012* (2013.01); *G06F 3/013* (2013.01);
(Continued)

(58) Field of Classification Search
CPC .............. G09G 5/10; G09G 3/3426; G09G 2320/0626; G09G 2320/068;
(Continued)

(56) References Cited

U.S. PATENT DOCUMENTS

2008/0218501 A1    9/2008 Diamond
2011/0310127 A1    12/2011 Arai
(Continued)

FOREIGN PATENT DOCUMENTS

JP    08-171377 A    7/1996
JP    2000-056878 A    2/2000
(Continued)

OTHER PUBLICATIONS

Extended European Search Report of EP Application No. 15773520.0, dated Oct. 2, 2017, 10 pages of EESR.
(Continued)

*Primary Examiner* — Abhishek Sarma
(74) *Attorney, Agent, or Firm* — Chip Law Group

(57) ABSTRACT

An image processing apparatus, an image processing method, and a program with which image data displayed in a display area of a terminal at a still position can be processed are provided. The image processing apparatus includes a still position detection section and a display control section. The still position detection section detects a still position of a terminal including a display area. The display control section controls a display form of image data that can be displayed from the display area based on the still position.

9 Claims, 16 Drawing Sheets

(51) Int. Cl.
   *G06F 3/01*      (2006.01)
   *G06F 1/16*      (2006.01)
   *G06T 5/00*      (2006.01)

(52) U.S. Cl.
   CPC ........... *G06T 5/006* (2013.01); *G09G 3/3426* (2013.01); *G09G 2320/062* (2013.01); *G09G 2320/068* (2013.01); *G09G 2320/0626* (2013.01); *G09G 2320/0693* (2013.01); *G09G 2320/08* (2013.01); *G09G 2320/103* (2013.01); *G09G 2360/145* (2013.01)

(58) Field of Classification Search
   CPC ..... G09G 2320/0693; G09G 2320/062; G09G 2320/08; G09G 2360/145; G09G 2320/103; G06T 5/006; G06F 3/013; G06F 1/1686; G06F 3/012
   See application file for complete search history.

(56) References Cited

U.S. PATENT DOCUMENTS

| | | | |
|---|---|---|---|
| 2012/0229487 A1 | 9/2012 | Samanta et al. | |
| 2013/0044124 A1 | 2/2013 | Reichert, Jr. | |
| 2014/0300570 A1* | 10/2014 | Matsumoto | G06F 3/0487 345/173 |
| 2014/0313230 A1* | 10/2014 | Suggs | G06T 3/00 345/648 |
| 2015/0116363 A1* | 4/2015 | Monte | G06T 3/60 345/659 |
| 2016/0139686 A1* | 5/2016 | Tu | G06F 1/1694 345/659 |

FOREIGN PATENT DOCUMENTS

| | | |
|---|---|---|
| JP | 2000-089712 A | 3/2000 |
| JP | 2003-186462 A | 7/2003 |
| JP | 2004-128712 A | 4/2004 |
| JP | 2006-227409 A | 8/2006 |
| JP | 2009-252096 A | 10/2009 |
| JP | 2010-021929 A | 1/2010 |
| JP | 2011-013515 A | 1/2011 |
| JP | 2011-141864 A | 7/2011 |
| JP | 2011-215591 A | 10/2011 |
| JP | 2013-242771 A | 12/2013 |
| JP | 2013-246761 A | 12/2013 |
| WO | 2011/138847 A1 | 11/2011 |
| WO | 2013/046596 A1 | 4/2013 |
| WO | 2013/095389 A1 | 6/2013 |
| WO | 2014/027569 A1 | 2/2014 |

OTHER PUBLICATIONS

Office Action for JP Patent Application No. 2016-511342, dated Jan. 22, 2019, 6 pages of Office Action and 6 pages of English Translation.

Office Action for JP Patent Application No. 2016-511342, dated Jul. 16, 2019, 02 pages of Office Action and 02 pages of English Translation.

* cited by examiner

IMAGE PROCESSING APPARATUS AND IMAGE PROCESSING METHOD

CROSS REFERENCE TO RELATED APPLICATIONS

This application is a U.S. National Phase of International Patent Application No. PCT/JP2015/000692 filed on Feb. 16, 2015, which claims priority benefit of Japanese Patent Application No. 2014-077837 filed in the Japan Patent Office on Apr. 4, 2014. Each of the above-referenced applications is hereby incorporated herein by reference in its entirety.

TECHNICAL FIELD

The present invention relates to an image processing apparatus, an image processing method, and a program with which image data displayed in a display area of a terminal at a still position can be processed.

BACKGROUND ART

In recent years, user terminals that are used while being held by users or being placed on desks or the like have prevailed rapidly. Examples of those terminals include a tablet, a smartphone, and a tablet PC (Personal Computer). The tablet PC includes a display unit equipped with a touch panel display and a keyboard unit equipped with a keyboard, and is structured to be capable of being switched between a tablet mode and a PC mode as in a clamshell-type PC.

There is known a technique of capturing, when a user uses the terminal while holding it, a position of a user's face with a camera equipped in a smartphone or the like and carrying out image processing based a change in a display angle with respect to the user's face (see Patent Documents 1 and 2).
Patent Document 1: Japanese Patent Application Laid-open No. 2013-246761
Patent Document 2: Japanese Patent Application Laid-open No. 2013-242771

SUMMARY OF INVENTION

Problem to be Solved by the Invention

However, the techniques disclosed in Patent Documents 1 and 2 presuppose that the techniques be applied when the user is holding the terminal, and have not considered image processing and the like in a case where the terminal is used in a still state.

In view of the circumstances as described above, the present technique aims at providing an image processing apparatus, an image processing method, and a program with which image data displayed in a display area of a terminal at a still position can be processed.

Means for Solving the Problem

To attain the object described above, according to an embodiment of the present technique, there is provided an image processing apparatus including a still position detection section and a display control section.

The still position detection section detects a still position of a terminal including a display area.

The display control section controls a display form of image data that can be displayed from the display area based on the still position.

With this structure, the display form of image data displayed from the display area of the terminal can be controlled based on the still position. Therefore, even when the terminal is at the still position where the user cannot see an image clearly, the display form of image data can be controlled so that the image can be seen clearly.

The still position detection section may judge whether the still position is a horizontal position, and the display control section may control the display form of image data when judged that the still position is a horizontal position.

As a result, it becomes possible to control image data particularly at the horizontal position where an image is apt to be seen unclearly.

Further, the display control section may change the display form between a first image area that occupies a lower portion of the image data in an erecting direction and a second display area that occupies an upper portion of the image data in the erecting direction.

With this structure, it becomes possible to differently change the display forms of the first image area and the second image area having different visibilities at the still position and control image data so that the image can be seen clearly as a whole.

Specifically, the display control section may include an enlargement processing section that executes, on the image data, processing of enlarging more in the erecting direction.

With this structure, it becomes possible to gradually enlarge image data at the upper portion in the erecting direction, which is apt to become seemingly small as a whole at the still position.

More specifically, the enlargement processing section may execute trapezoid correction processing of enlarging an upper area of an object in the image data in the erecting direction, along a uniaxial direction orthogonal to the erecting direction.

With this structure, it becomes possible to execute inverted trapezoid correction processing on an object that is apt to become seemingly distorted in a trapezoid at the still position and control image data so that the image can be seen by a natural aspect ratio.

Alternatively, the image data may include a plurality of objects distributed in the erecting direction, and the enlargement processing section may execute processing of enlarging, out of the plurality of objects distributed in the erecting direction in the image data, objects displayed closer to the upper portion in the erecting direction more.

With this structure, it becomes possible to enlarge the object displayed at the upper portion in the erecting direction where the object is apt to become seemingly small at the still position and correct image data so that the image can be seen clearly.

Alternatively, the enlargement processing section may execute processing of enlarging an object in the image data along the erecting direction such that the object is enlarged more along the erecting direction.

Also with this structure, it becomes possible to gradually enlarge image data at the upper portion in the erecting direction, which is apt to become seemingly small as a whole at the still position.

Further, the display control section may include an image quality correction section capable of correcting the first image area and the second image area to have different image qualities.

With this structure, it becomes possible to correct image qualities of the first image area and the second image area having different visibilities to different image qualities at the still position and control image data so that the image looks uniform as a whole.

Specifically, the image quality correction section may set luminance of the second image area to be lower than that of the first image area.

With this structure, it becomes possible to relatively lower luminance of the second image area that seems brighter than the first image area at the still position and control image data so that the image can be seen in uniform luminance as a whole.

Alternatively, the image quality correction section may execute, on the image data, processing of emphasizing edges of the second image area more than those of the first image area.

With this structure, it becomes possible to emphasize edges of the second image area that are apt to become more unclear than those of the first image area at the still position and control image data so that the image can be seen clearly as a whole.

Alternatively, the image quality correction section may execute, on the image data, processing of correcting the first image area and the second image area in different tones.

With this structure, it becomes possible to correct tones of the first image area and the second image area that are apt to be seen in different tones at the still position and control image data so that the image can be seen in a uniform color gamut as a whole.

Further, the image processing apparatus may further include an illuminance detection section that detects illuminance information in a periphery of the display area, and the image quality correction section may correct the image quality based on the detected illuminance information.

With this structure, it becomes possible to more-accurately correct image qualities based on the actual illuminance in the periphery of the display area.

The image processing apparatus may further include a light-emitting source detection section that detects a position of a light-emitting source in an area opposing the display area, and the display control section may include a reflection area detection section that detects a reflection area in the display area from which reflected light of the light-emitting source is emitted, based on a relationship among the detected position of the light-emitting source, an estimated position of user's eyes at the still position, and a position of the display area, and a display form change section that changes a display form of a reflection image area displayed in the reflection area.

With this structure, it becomes possible to change the display form of the reflection image area corresponding to the reflection area from which reflected light of the light-emitting source such as an illumination is emitted and eliminate difficulty in seeing the image due to the reflected light.

The image processing apparatus may further include a pickup data acquisition section that acquires image data of an area opposing the display area, that has been captured at the still position, and the light-emitting source detection section may detect the position of the light-emitting source based on the acquired image data.

With this structure, it becomes possible to more-accurately grasp the position of the light-emitting source and accurately detect the reflection area.

Specifically, the display form change section may execute processing of moving an object arranged inside the reflection image area to an area outside the reflection image area.

With this structure, it becomes possible to move the object in the reflection image area, which is apt to become unclear, to a position where the object can be seen clearly.

Alternatively, the display form change section may execute image quality correction processing on the reflection image area.

For example, the image quality correction processing may be processing of lowering luminance.

With this structure, it becomes possible to correct the image quality of the reflection image area so that it can be seen more clearly.

The image processing apparatus may further include a display section that displays the image data from the display area.

To attain the object described above, according to an embodiment of the present technique, there is provided an image processing method including detecting a still position of a terminal including a display area.

A display form of image data that can be displayed from the display area is controlled based on the still position.

To attain the object described above, according to an embodiment of the present technique, there is provided a program that causes an information processing apparatus to function as a still position detection section and a display control section.

The still position detection section detects a still position of a terminal including a display area.

The display control section controls a display form of image data that can be displayed from the display area based on the still position.

Effects of the Invention

As described above, according to the present technique, it is possible to provide an image processing apparatus, an image processing method, and a program with which image data displayed in a display area of a terminal at a still position can be processed.

It should be noted that the effects described herein are not particularly limited, and any of the effects described in the specification may also be obtained.

MODES FOR CARRYING OUT THE INVENTION

Hereinafter, embodiments of the present technique will be described with reference to drawings.

First Embodiment (Schematic Structure of Image Processing Apparatus)

Figure 1A:
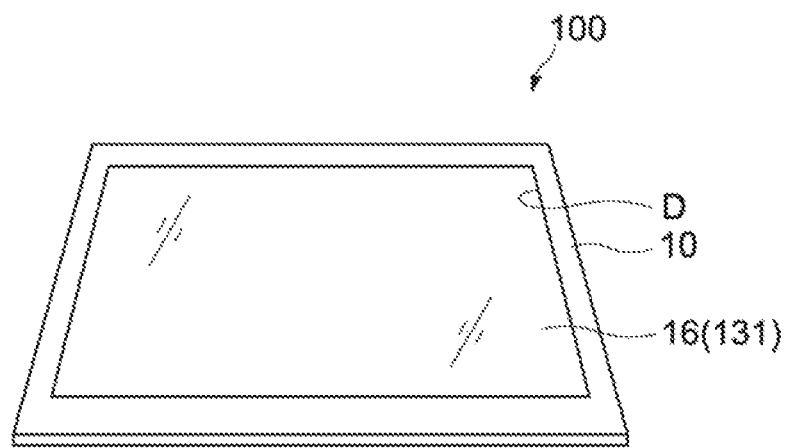
FIG. 1A and FIG. 1B Perspective views each showing an outer appearance of an image processing apparatus according to a first embodiment of the present technique.
Figure 1B:
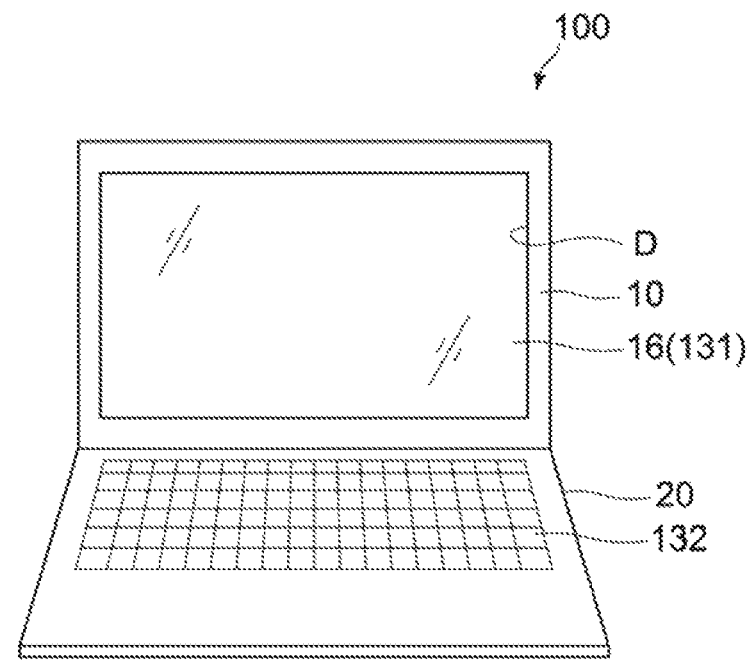

FIGS. 1A and 1B are perspective views each showing an outer appearance of an image processing apparatus 100 according to a first embodiment of the present technique. In this embodiment, the image processing apparatus 100 is structured as an information processing apparatus as a user terminal, more specifically, as a tablet PC (Personal Computer) or the like. The tablet PC can be switched between a tablet mode in which the image processing apparatus 100 can be used similar to a tablet and a PC mode in which the image processing apparatus 100 can be used similar to a laptop PC. FIG. 1A shows an example of the tablet mode, and FIG. 1B shows an example of the PC mode.

The image processing apparatus 100 includes a display unit 10 and a keyboard unit 20. The display unit 10 includes a display 16 in which a display area D to be described later is fixed. The display 16 is structured as a touch panel display including a touch panel 131 with which touch operations can be made. The keyboard unit 20 includes a keyboard 132 with which push operations can be made.

The display unit 10 and the keyboard unit 20 may be connected by a mechanical mechanism or may be structured to be separate from each other. By changing the arrangement or connection manner between the keyboard unit 20 and the display unit 10, the image processing apparatus 100 can be switched between the tablet mode and the PC mode.

In the tablet mode, the display unit 10 and the keyboard unit 20 may be superimposed on each other as one thin plate such that the display 16 comes in the front as shown in FIG. 1A. Alternatively, the display unit 10 alone may be used. In the tablet mode, the image processing apparatus 100 may be operated while being placed still on a desk or the like (refer to still position to be described later), or the image processing apparatus 100 may be operated while being held by a user.

In the PC mode, the display unit 10 is tilted a predetermined angle from the keyboard unit 20 placed still on a desk or the like as shown in FIG. 1B.

The method of switching the mode between the tablet mode and the PC mode is not particularly limited. For example, when those units are connected by a mechanical mechanism, the mode may switched as the display unit 10 is slid, tilted, or the like from the keyboard unit 20. Alternatively, when those units 10 and 20 are provided separate from each other, the mode may be switched to the PC mode when the units 10 and 20 are in communication with each other and switched to the tablet mode when the display unit 10 alone is used.

Such an image processing apparatus 100 has a hardware structure as follows.

(Hardware Structure of Image Processing Apparatus)

Figure 2:
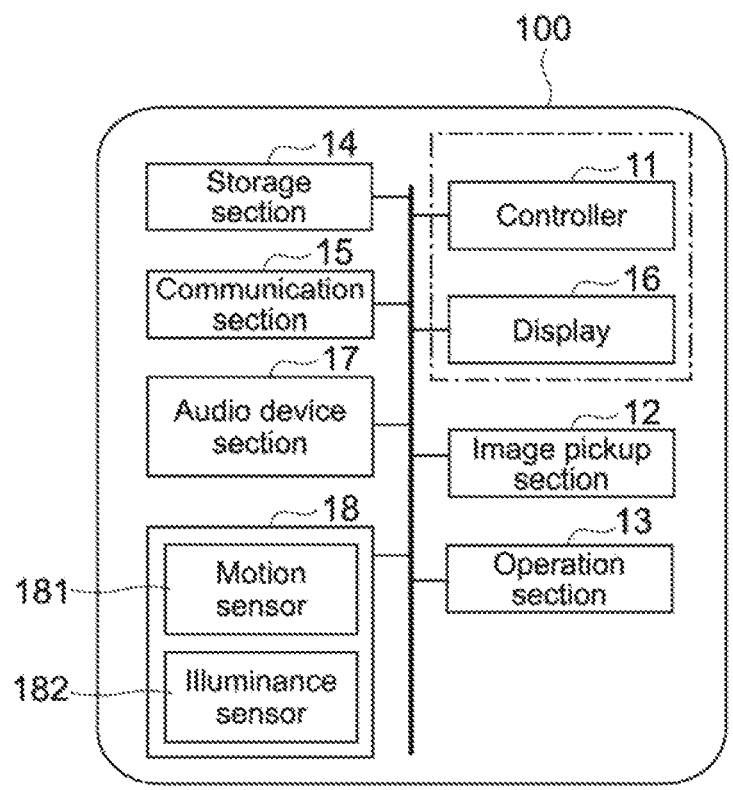
FIG. 2 A block diagram showing a hardware structure of the image processing apparatus.

FIG. 2 is a block diagram showing a hardware structure of the image processing apparatus 100. The image processing apparatus 100 includes a controller 11, an image pickup section 12, an operation section 13, a storage section 14, a communication section 15, a display 16, an audio device section 17, and a sensor section 18. Those sections are mutually connected via a bus and structured to be capable of transferring data and exchanging control signals.

The controller 11 includes a processor such as a CPU (Central Processing Unit) and collectively controls the respective sections of the image processing apparatus 100. The controller 11 executes predetermined processing according to control programs stored in a ROM (Read Only Memory) (not shown) or the storage section 14.

The image pickup section 12 includes a camera lens 121 and obtains image data from an optical image of a subject. The camera lens 121 is provided in the periphery of the display 16 of the display unit 10, for example. Specifically, the image pickup section 12 may include an image pickup optical system and an image sensor (not shown). The image pickup optical system images an optical image of a subject on an image pickup surface of the image sensor. The image pickup optical system is capable of adjusting a focal distance, a subject distance, an aperture, and the like based on instructions from the controller 11 so that an appropriate image can be obtained. The image sensor is realized by a CCD (Charge Coupled Device) sensor, a CMOS (Complementary Metal Oxide Semiconductor) sensor, and the like and converts the imaged optical image into electric signals to obtain image data.

The operation section 13 includes input devices such as a touch panel 131 provided in the display 16, the keyboard 132 provided in the keyboard unit 20, and a power button (not shown). The operation section 13 detects input operations made by a user and transmits operation signals to the controller 11.

The storage section 14 may be constituted of a semiconductor memory such as a flash memory, a recording medium such as a magnetic disk, an optical disc, and a magneto-optical disc, a recording/reproducing mechanism with respect to those recording media, and the like.

The communication section 15 is communicable via a network. The communication section 15 is communicable via a network using a wide area communication system such as 3G (Third Generation) and LTE (Long Term Evolution), a wireless LAN (Local Area Network) communication system such as Wi-Fi (registered trademark), a wired LAN communication system, or the like. The communication section 15 may also be structured to be capable of performing near field communication that uses communication systems of Bluetooth (registered trademark), infrared rays, and the like, receiving GPS, and the like. The communication section 15 may also be capable of being connected to another apparatus by wires via a predetermined terminal.

The display 16 is realized by, for example, a display device such as an LCD (Liquid Crystal Display) panel and an organic EL (Electroluminescence) panel, a backlight, and the like. The display 16 may include a D/A conversion circuit and the like in addition to the display device.

The audio device section 17 includes a microphone and a speaker.

The sensor section 18 includes a motion sensor 181 and an illuminance sensor 182. The motion sensor 181 includes an acceleration sensor, an angular velocity sensor, and the like and is provided in the display unit 10, for example. The acceleration sensor is capable of detecting accelerations in triaxial directions orthogonal to one another, for example. The angular velocity sensor is structured as a gyro sensor capable of detecting angular velocities about the triaxial directions orthogonal to one another, for example. The illuminance sensor 182 may be provided in the periphery of the display 16, for example. Although not shown, the sensor section 18 may also include a circuit for converting signals acquired from the sensors above and the like into electric signals that can be used in the processing of the controller 11.

In addition to those described above, the sensor section 18 may include a sensor used for detecting a mode, which is to be described later. Examples of such a sensor include an electrostatic sensor arranged in the periphery of the keyboard 132, a sensor that detects a connection mechanism of the display unit 10 and the keyboard unit 20, and the illuminance sensor 182 arranged in the periphery of the keyboard 132.

In the image processing apparatus 100 having the hardware structure as described above, the controller 11 and the display 16 surrounded by the dashed-dotted line of FIG. 2 have a functional structure as follows.

Figure 3:
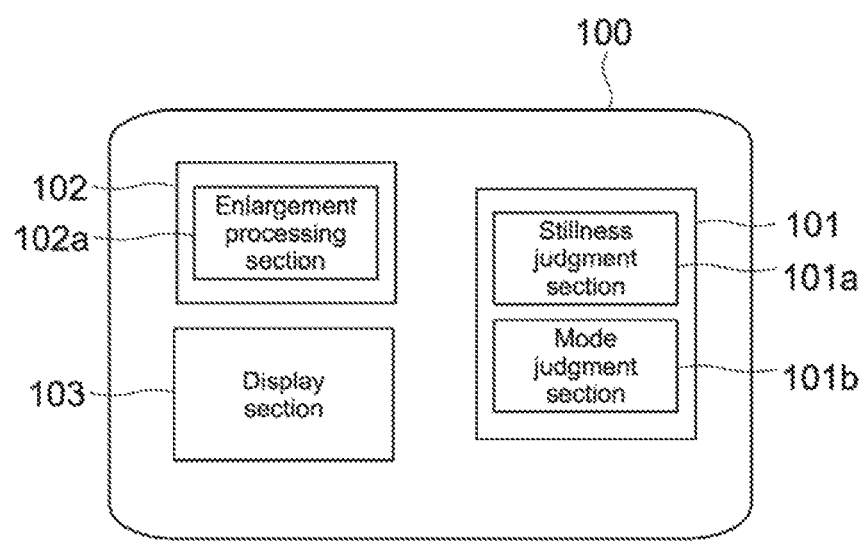
FIG. 3 A block diagram showing a functional structure of the image processing apparatus.

FIG. 3 is a block diagram showing a functional structure of the image processing apparatus 100. As shown in the figure, the image processing apparatus 100 includes a still position detection section 101, a display control section 102, and a display section 103.

The still position detection section 101 detects a still position of a terminal including a display area D. In this embodiment, the "terminal" refers to the image processing apparatus 100. The still position detection section 101 is realized by the controller 11, for example. The still position detection section 101 includes, for example, a stillness judgment section 101a and a mode judgment section 101b. Based on judgment results obtained by the stillness judgment section 101a and the mode judgment section 101b, the still position detection section 101 can judge whether the still position is a horizontal position.

Based on the output from the motion sensor 181, the stillness judgment section 101a judges whether the image processing apparatus 100 is still. For example, when the image processing apparatus 100 is placed still, angular velocities to be detected become smaller than in the case where the user is operating the image processing apparatus 100 while holding it. As described above, it becomes possible to judge whether the image processing apparatus 100 is still based on the acquired angular velocity values.

The mode judgment section 101b judges whether the image processing apparatus 100 is in the tablet mode. For example, the mode judgment section 101b is realized by the controller 11. The method of judging a mode by the mode judgment section 101b is not particularly limited.

For example, when the display unit 10 and the keyboard unit 20 are mechanically connected, the mode judgment section 101b can judge that the mode is the tablet mode in which the units 10 and 20 become one thin plate based on outputs from a predetermined sensor. Examples of the predetermined sensor include an electrostatic sensor arranged in the periphery of the keyboard 132, a sensor that detects an operation of the connection mechanism of the sensor section 18, and the illuminance sensor 182 arranged in the periphery of the keyboard 132. Alternatively, when the units 10 and 20 are provided separate from each other and the units 10 and 20 are not in communication with each other, the mode judgment section 101b may judge that the image processing apparatus 100 is in the tablet mode.

When judged as still by the stillness judgment section 101a and judged as the tablet mode by the mode judgment section 101b, the still position detection section 101 can judge that the still position of the image processing apparatus 100 is a horizontal position. The "horizontal position" used herein refers to a position at which the image processing apparatus 100 is placed still on a substantially-flat surface such as a desk, floor, and knees of a user, where the user normally places the image processing apparatus 100 to use it in the tablet mode.

Based on the still position, the display control section 102 controls a display form of image data displayable from the display area D. The display control section 102 is realized by the controller 11, for example. Image data whose display form is to be controlled may be image data captured by the image pickup section 12 or image data stored in the storage section 14. Moreover, the image data may either be still image data or moving image data.

In this embodiment, the display control section 102 is capable of controlling the display form of image data when judged that the still position is the horizontal position.

Figure 4:
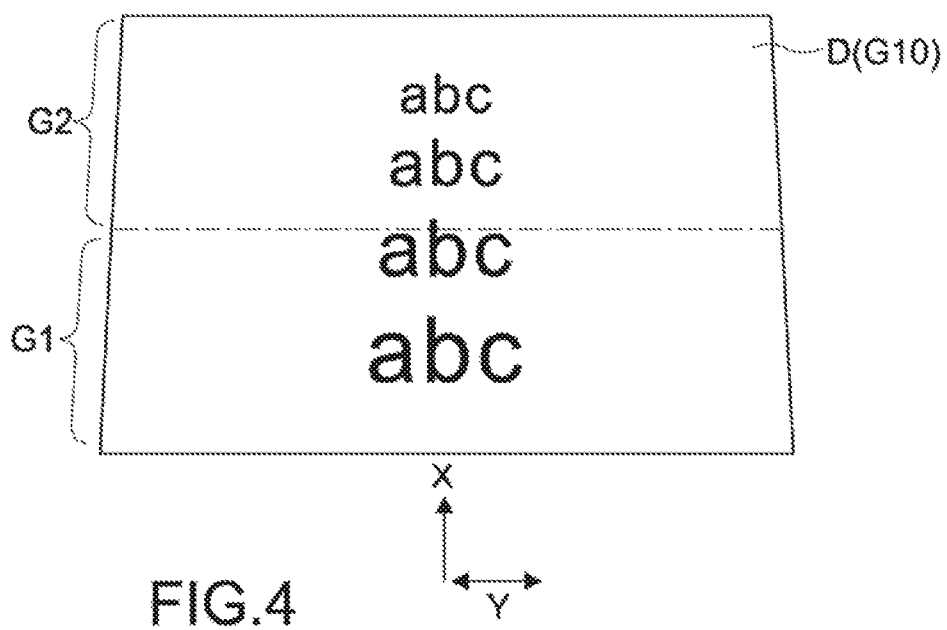
FIG. 4 A diagram showing an example of how a user sees image data displayed in a display area of a terminal at a horizontal still position.

FIG. 4 is a diagram showing an example of how a user sees image data G10 displayed from the display area D at the horizontal still position. As shown in the figure, in the image data G10, an object in a first image area G1 occupying a lower portion in an X direction (erecting direction) and an object in a second image area G2 occupying an upper portion in the X direction can be seen differently. In other words, even when the objects are actually displayed in the same size, the object in the second image area G2 seems smaller than that in the first image area G1 and is also displayed in a collapsed form. The object may be letters or figures.

It should be noted that the "lower portion in the X direction" in the image data refers to a portion displayed on a nearer side of the user in the tablet mode and a portion displayed at the lower portion in the PC mode. Further, the "upper portion in the X direction" in the image data refers to a portion displayed on a farther side from the user in the tablet mode and a portion displayed at the upper portion in the PC mode.

In this regard, the display control section 102 is capable of changing the display form between the first image area G1 occupying the lower portion in the X direction in the image data G10 and the second image area occupying the upper portion in the X direction in the image data G10.

Specifically, the display control section 102 includes an enlargement processing section 102a that executes processing of enlarging image data more in the X direction. The enlargement processing section 102a may execute trapezoid correction processing of enlarging an area of the upper portion of the objects in the image data in the X direction, along a Y-axis direction (uniaxial direction, lateral direction) orthogonal to the X direction. The trapezoid correction processing may be processing of enlarging the area of the upper portion of the objects in the X direction along the Y-axis direction and reducing an area of the lower portion of the objects in the X direction along the Y-axis direction. The trapezoid correction processing of this embodiment may be so-called inverted trapezoid correction processing of performing correction so as to distort an object displayed in the original display resolution in a trapezoid.

The display section 103 displays image data G20 whose display form has been controlled by the display control section 102, from the display area D. The display section 103 is realized by the display 16, for example.

Figure 5:
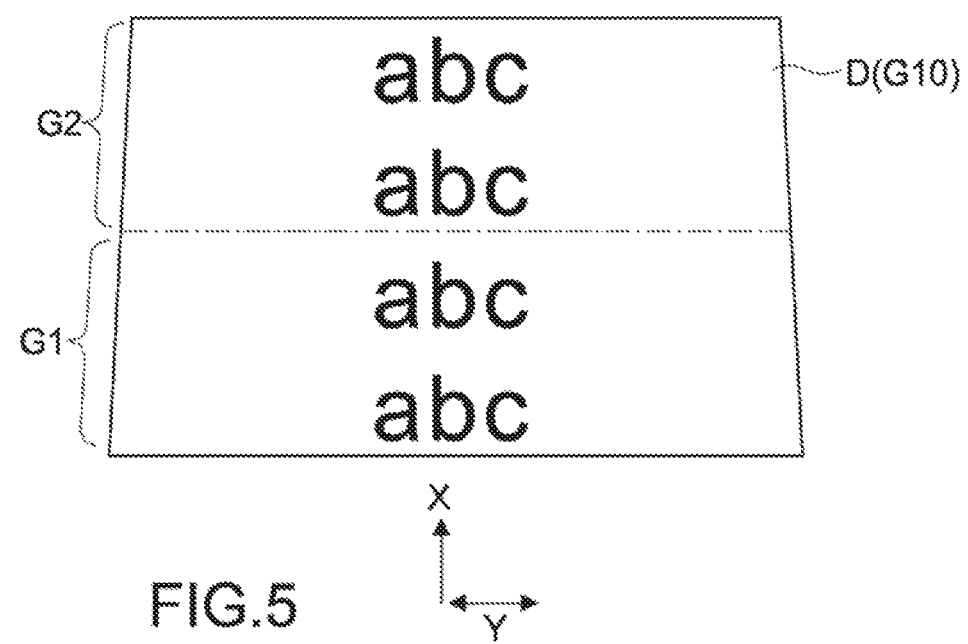
FIG. 5 A diagram showing an example of how a user sees image data in which display form is controlled.

FIG. 5 is a diagram showing an example of how the user sees the image data G20. As shown in the figure, in the image data G20, the objects can be displayed in the same aspect ratio as that when the display area D is seen from directly above even at the still position in the tablet mode. It should be noted that the pixel count in this case may become smaller than that displayed from the display area D at the upper portion in the X direction.

Hereinafter, an operation example of the image processing apparatus 100 having the structure described above will be described.

(Operations of Image Processing Apparatus)

Figure 6:
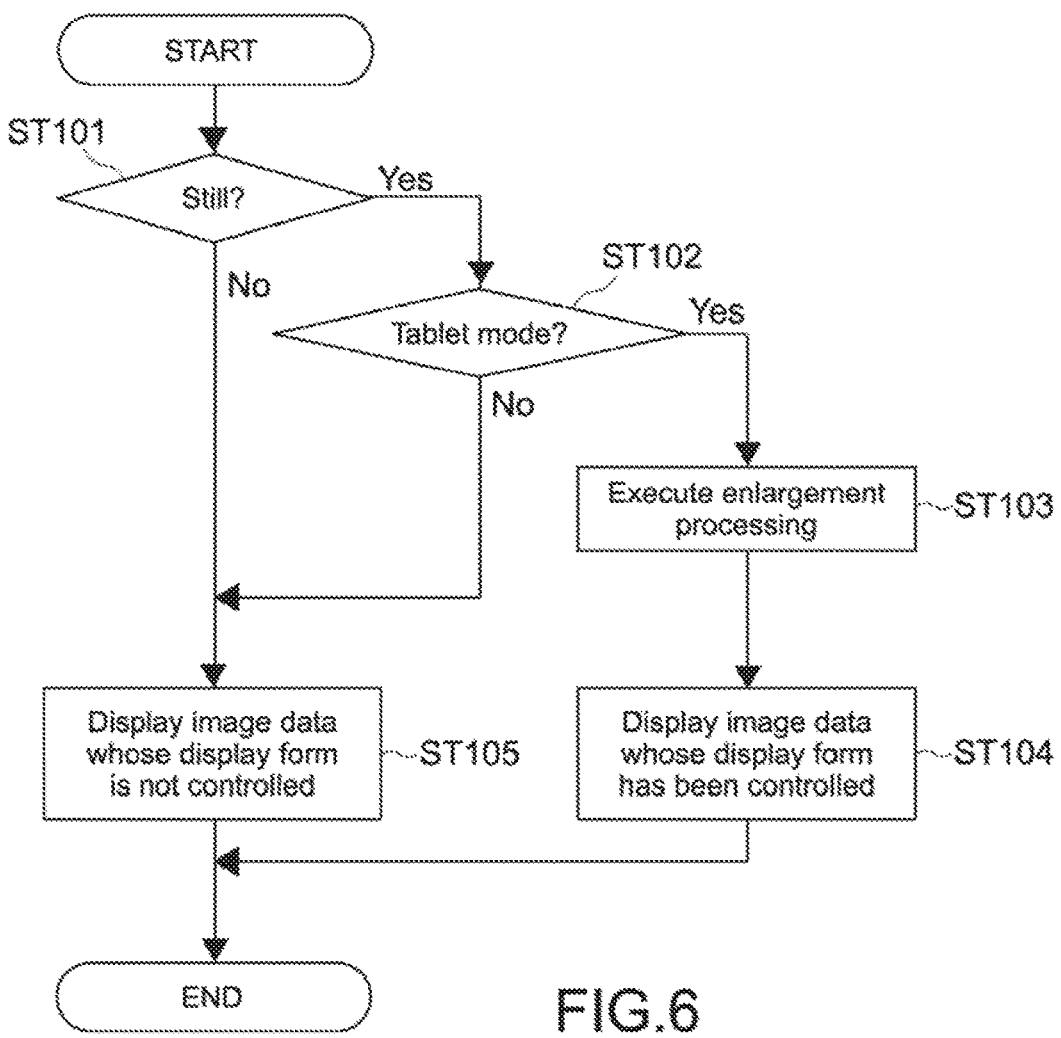
FIG. 6 A flowchart showing operations of the image processing apparatus.

FIG. 6 is a flowchart showing operations of the image processing apparatus 100.

First, the still position detection section 101 detects a still position of the image processing apparatus 100 including the display area. Specifically, the stillness judgment section 101a judges whether the image processing apparatus 100 is still based on the output from the motion sensor 181 (ST101). When judged as still (Yes in ST101), the mode judgment section 101b judges whether the image processing apparatus 100 is in the tablet mode (ST102).

In either case where it is judged as unstill by the stillness judgment section 101a (No in ST101) and it is judged as not being in the tablet mode by the mode judgment section 101b (No in ST102), the display section 103 displays the image data G10 whose display form is not controlled (ST105).

On the other hand, when judged as being in the tablet mode (Yes in ST102), it is judged that the still position is the horizontal position, and the display control section 102 controls the display form of the image data displayable from the display area based on the detected still position. Specifically, the enlargement processing section 102a of the display control section 102 executes processing of enlarging the image data more in the X direction. In this embodiment, the trapezoid correction processing described above is executed (ST103).

Finally, the display section 103 displays the image data whose display form has been controlled by the display control section 102 from the display area (ST104).

As described above, in this embodiment, it becomes possible to control the display form of the image data based on the still position. As a result, even in the case of a still position at which the second image area is difficult to be seen from the user, a clear and easy-to-see image can be displayed. Consequently, it becomes possible to more-comfortably view an image even when the tablet PC in the display mode, a tablet, a smartphone, and the like are placed still.

Hereinafter, modified examples of this embodiment will be described. It should be noted that the similar structures are denoted by the same symbols, and descriptions thereof will be omitted.

Modified Example 1-1

The processing of enlarging an object, that is carried out by the enlargement processing section 102a, is not limited to the trapezoid correction processing. Of a plurality of objects distributed along the X direction in data, the enlargement processing section 102a may execute processing of enlarging objects displayed closer to the upper portion in the X direction more.

More specifically, when objects are letters, the enlargement processing section 102a executes processing of enlarging letter sizes of objects closer to a second side D2 more. Also by this processing, it is possible to show the user an image similar to that seen from above. In addition, it becomes possible to change the display form without changing the display resolution in the display area D.

Also by this processing, the display control section 102 can show the user an image that can be easily seen at the still position.

Modified Example 1-2

In addition to those described above, the enlargement processing section 102a may execute processing of enlarging objects in image data more in the X direction. Also by this processing, it becomes possible to display to the user an image that is close to that seen from above.

Modified Example 1-3

Figure 7:
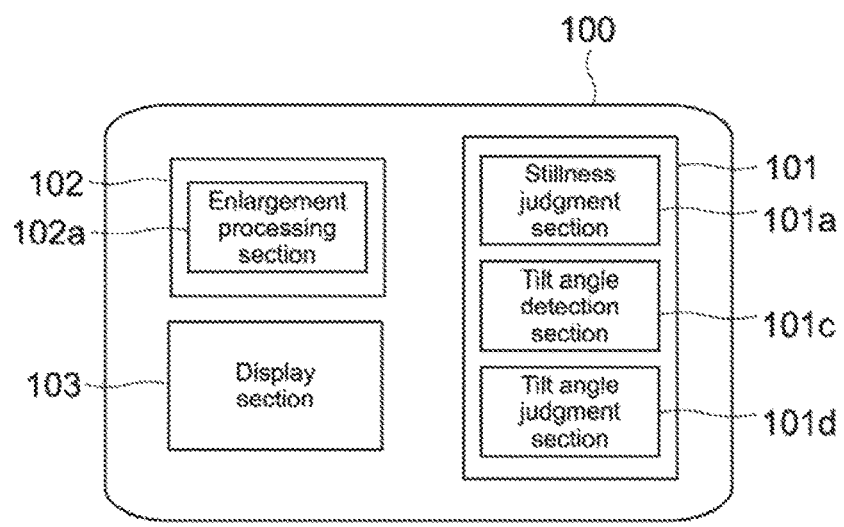
FIG. 7 A block diagram showing a functional structure of the image processing apparatus according to a modified example of the first embodiment.

FIG. 7 is a block diagram showing a functional structure of the image processing apparatus 100 according to this modified example. As shown in the figure, the still position detection section 101 may include a tilt angle detection section 101c and a tilt angle judgment section 101d in place of the mode judgment section 101b. In other words, the still position detection section 101 may include the stillness judgment section 101a, the tilt angle detection section 101c, and the tilt angle judgment section 101d.

The tilt angle detection section 101c integrates angular velocities and the like and calculates a tilt angle from the horizontal surface of the display area based on the output from the motion sensor 181.

The tilt angle judgment section 101d judges whether the tilt angle from the horizontal surface detected by the tilt angle detection section 101c is equal to or smaller than a predetermined tilt angle. In the case where the predetermined tilt angle is set to an angle close to 0°, the still position can be judged as the horizontal position when it is judged that the detected tilt angle is equal to or smaller than the predetermined tilt angle. Therefore, the still position detection section 101 can judge whether the still position is the horizontal position based on the tilt angle even without the mode judgment section 101b.

Moreover, according to this modified example, it is possible to more-accurately judge the horizontal still position in the case where the "terminal" is a terminal that does not perform judgment on the tablet mode as in a tablet or a smartphone.

Modified Example 1-4

The display control section 102 is not limited to the structure of controlling the display form when the still position is judged to be the horizontal position. For example, the display control section 102 may control the display form of image data when it is judged by the tilt angle judgment section 101d that the tilt angle is equal to or smaller than a predetermined tilt angle. As a result, it becomes possible to control the display form by the display control section 102 in the case of a still position at a tilt angle equal to or smaller than a tilt angle at which it is presumed that an image is difficult to be seen by the user. The predetermined tilt angle is, for example, 45° or less, though not limited in particular.

Second Embodiment (Functional Structure of Image Processing Apparatus)

Figure 8:
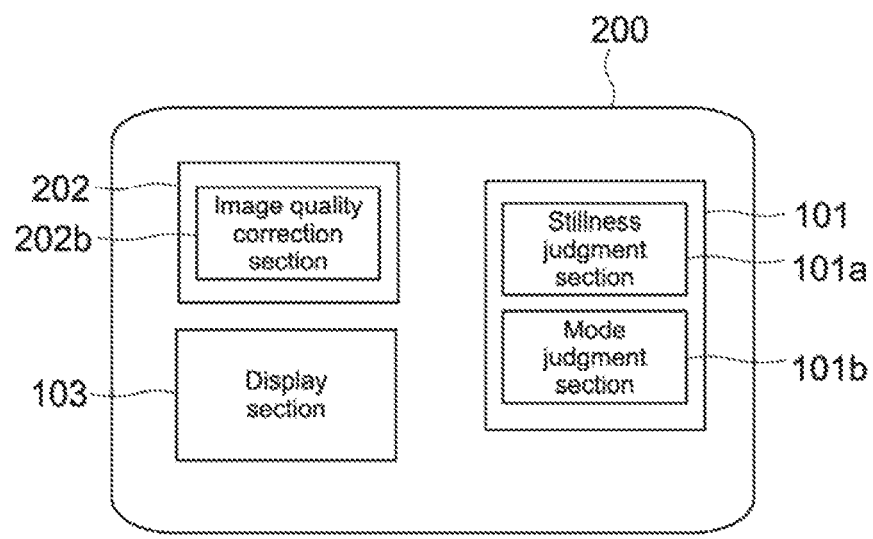
FIG. 8 A block diagram showing a functional structure of an image processing apparatus according to a second embodiment of the present technique.

FIG. 8 is a block diagram showing a functional structure of an image processing apparatus 200. As shown in the figure, the image processing apparatus 200 includes the still position detection section 101, a display control section 202, and the display section 103. In other words, in this embodiment, the image processing apparatus 200 includes the display control section 202 having a different structure from the display control section 102. It should be noted that the still position detection section 101, the display section 103, and the hardware structure are similar to those of the embodiment above. Therefore, the same symbols are used, and descriptions thereof will be omitted.

As in the first embodiment, the display control section 202 is capable of changing the display form between the first image area occupying the lower portion of the image data in the X direction and the second image area occupying the upper portion of the image data in the X direction. Unlike in the first embodiment, the display control section 202 includes an image quality correction section 202b capable of differently setting image qualities of the first image area and the second image area. More specifically, the image quality correction section 202b is capable of setting luminance of the second image area to be lower than that of the first image area.

In general, in the image data displayed from the display area at the horizontal still position, the first image area seems darker than the second image area. This is due to a difference between an angle formed between a line, that connects the user's eyes and the first image area, and the flat surface of the display area and an angle formed between a line, that connects the user's eyes and the second image area, and the flat surface of the display area. This may also be due to the fact that a shadow of the user appears in the first image area arranged closer to the user. By the image quality correction section 202b according to this modified example, it becomes possible to display an image having a uniform luminance distribution as a whole at the still position.

The image quality correction section 202b is capable of executing luminance correction processing of setting a luminance value of the second image area to be lower than that of the first image area as an approach of image processing by software, for example. In this case, at least one of the processing of raising the luminance value of the first image area and the processing of lowering the luminance value of the second image area may be executed. Moreover, it is also possible to gradually change the luminance value in the X direction.

Alternatively, the image quality correction section 202b can control hardware capable of adjusting luminance. For example, the image quality correction section 202b may set the luminance of the second image area to be lower than that of the first image area by adjusting a backlight intensity of the display 16. Specifically, the image quality correction section 202b can control backlight such that the intensity of backlight corresponding to the second image area becomes lower than that of the backlight corresponding to the first image area.

Further, the image quality correction section 202b may execute both the image processing by software and the control by hardware.

(Operations of Image Processing Apparatus)

Figure 9:
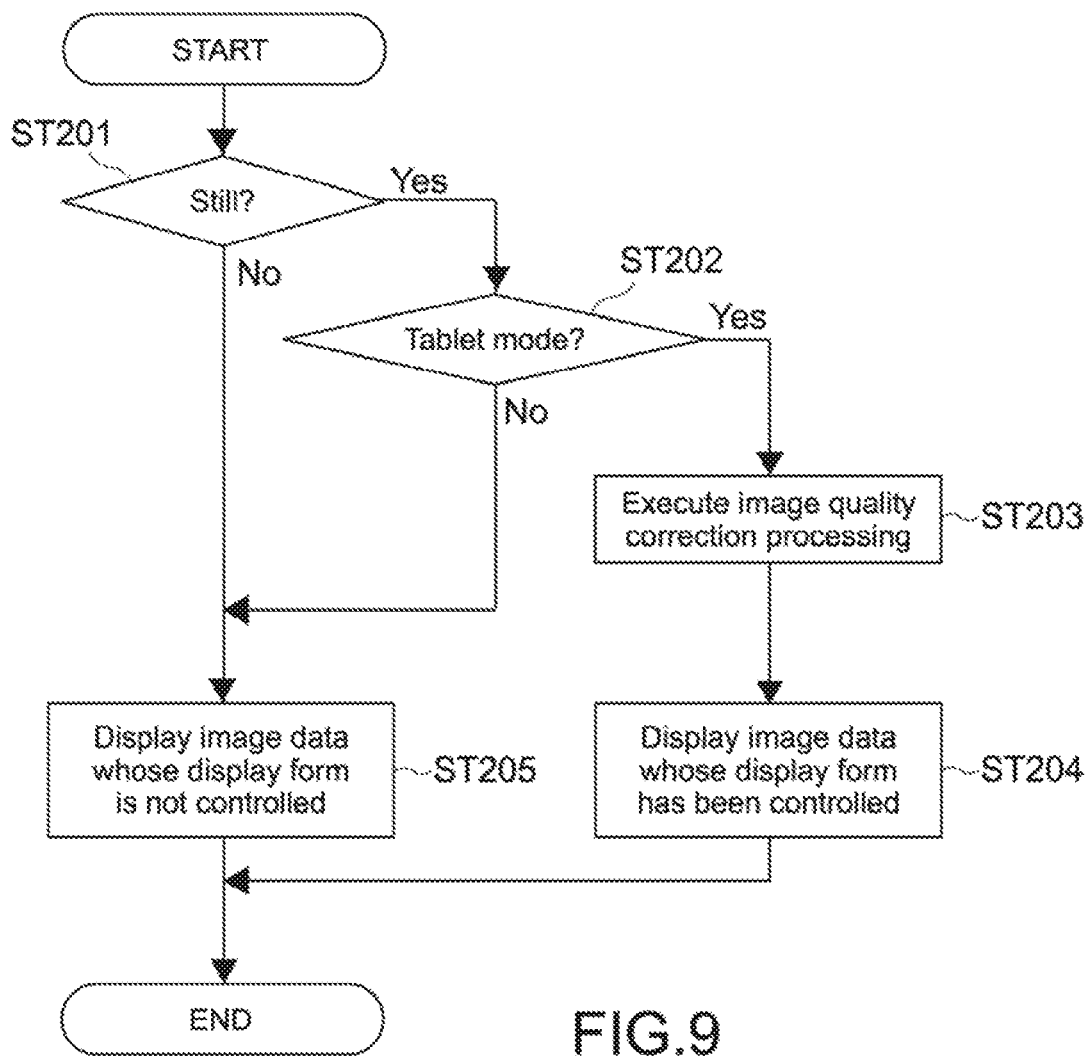
FIG. 9 A flowchart showing operations of the image processing apparatus.

FIG. 9 is a flowchart showing operations of the image processing apparatus 200.

First, the still position detection section 101 detects a still position of the image processing apparatus 200 including the display area. Specifically, the stillness judgment section 101a judges whether the image processing apparatus 200 is still based on the output from the motion sensor 181 (ST201). When judged as still (Yes in ST201), the mode judgment section 101b judges whether the image processing apparatus 200 is in the tablet mode (ST202).

In either case where it is judged as unstill by the stillness judgment section 101a (No in ST201) and it is judged as not being in the tablet mode by the mode judgment section 101b (No in ST202), the display section 103 displays the image data whose display form is not controlled (ST205).

On the other hand, when judged as being in the tablet mode (Yes in ST202), it is judged that the still position is the horizontal position, and the display control section 202 controls the display form of the image data displayable from the display area based on the detected still position (ST203). Specifically, the image quality correction section 202b of the display control section 202 sets the luminance of the second image area to be lower than that of the first image area.

Finally, the display section 103 displays the image data whose display form has been controlled by the display control section 202 (ST204).

Even in the image processing apparatus 200 as described above, it becomes possible to display to the user an image that is close to that seen from above. Therefore, an image can be viewed more comfortably.

Modified Example 2-1

For example, the image quality correction section 202b may execute, on image data, processing of emphasizing edges of the second image area more than those of the first image area. Since the second image area is apt to become unclear at the horizontal position, the processing of emphasizing edges enables the second image area to be seen clearly. Processing of gradually emphasizing edges in the X direction may also be executed.

Modified Example 2-2

Alternatively, the image quality correction section 202b may execute, on image data, processing of correcting the first image area and the second image area in different tones. In the image data at the horizontal position, the color gamut that can be seen may vary between the first image area and the second image area. By correcting tones of the first image area G1 and the second image area G2 by the image quality correction section 202b according to this modified example, it becomes possible to correct variances in the color gamut as described above.

It should be noted that the image quality correction section 202b may execute two or more of the luminance correction, the edge emphasis, and the tone correction. As a result, it becomes possible to display an image that can be seen more clearly.

Modified Example 2-3

Figure 10:
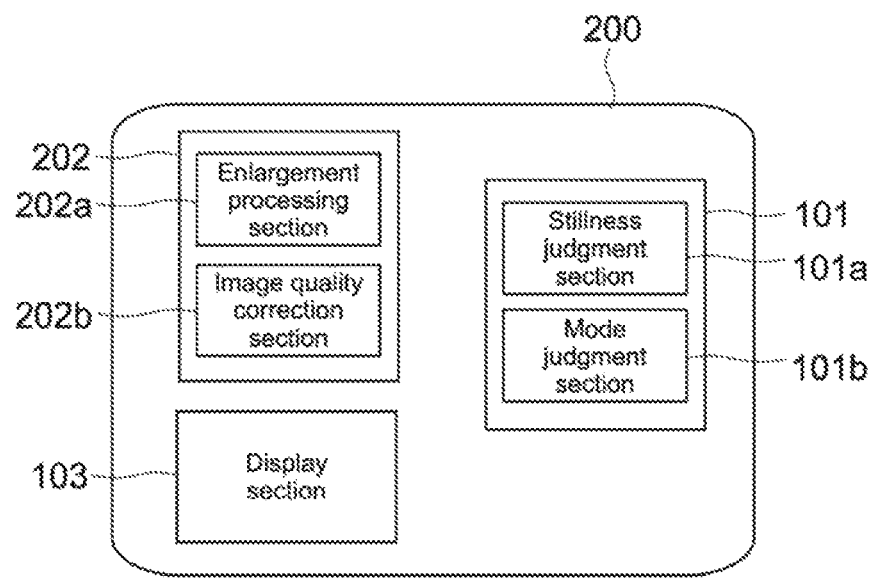
FIG. 10 A block diagram showing a functional structure of the image processing apparatus according to a modified example of the second embodiment.

FIG. 10 is a block diagram showing a functional structure of the image processing apparatus 200 according to this modified example. As shown in the figure, the display control section 202 may include an enlargement processing section 202a in addition to the image quality correction section 202b.

The enlargement processing section 202a may have a structure similar to the enlargement processing section 102a. Specifically, the enlargement processing section 202a executes, on image data, processing of enlarging an object more in the X direction. The enlargement processing section 202a may also execute trapezoid correction processing of enlarging an upper area of an object in the image data in the X direction, along the Y-axis direction orthogonal to the X direction. Alternatively, when there are a plurality of objects distributed along the X direction, it is possible to execute processing of enlarging, out of the plurality of objects, objects distributed closer to the upper portion of the display area in the X direction more. Alternatively, processing of enlarging objects in the image data more in the X direction, along the X direction may be executed.

It should be noted that in the operations of the image processing apparatus 200, the order in which the image quality correction by the image quality correction section 202b and the enlargement processing by the enlargement processing section 202a are carried out is not particularly limited.

Modified Example 2-4

Figure 11:
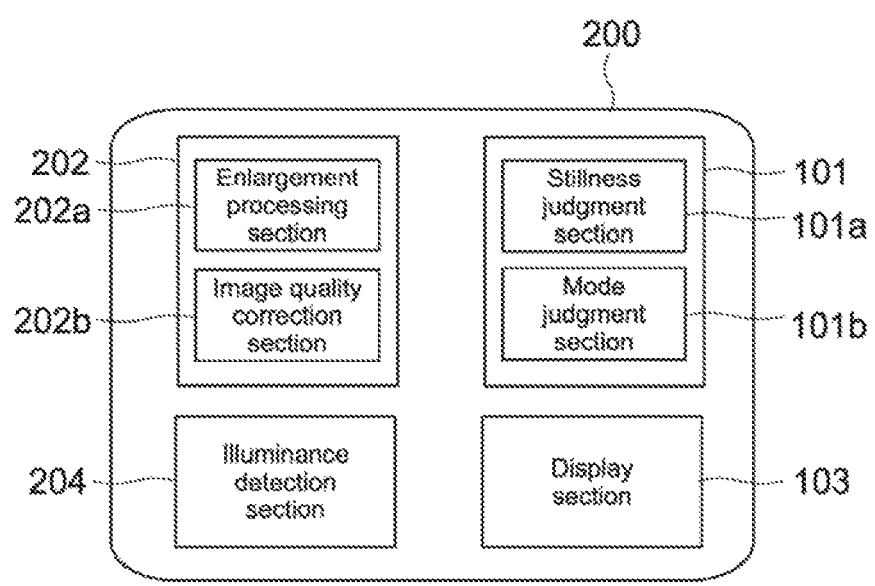
FIG. 11 A block diagram showing a functional structure of the image processing apparatus according to another modified example of the second embodiment.

FIG. 11 is a block diagram showing a functional structure of the image processing apparatus 200 according to this modified example. As shown in the figure, the image processing apparatus 200 may include an illuminance detection section 204 in addition to the still position detection section 101, the display control section 202, and the display section 103.

The illuminance detection section 204 detects illuminance information in the periphery of the display area D. The illuminance detection section 204 is realized by the controller 11, for example. The illuminance detection section 204 detects illuminance information based on the output from the illuminance sensor 182 of the sensor section 18 provided in the periphery of the display area D.

The image quality correction section 202b may be capable of correcting image qualities based on the detected illuminance information. The image quality correction may be the luminance adjustment, the edge emphasis, the tone correction, and the like described above. Accordingly, more-appropriate image quality correction can be performed based on the information on brightness in the environment in which the user actually uses the image processing apparatus.

Other Modified Example

In this embodiment, as in the modified examples 1-3 and 1-4, the still position detection section 101 may include the stillness judgment section 101a, the tilt angle detection section 101c, and the tilt angle judgment section 101d (see FIG. 7).

Third Embodiment (Functional Structure of Image Processing Apparatus)

Figure 12:
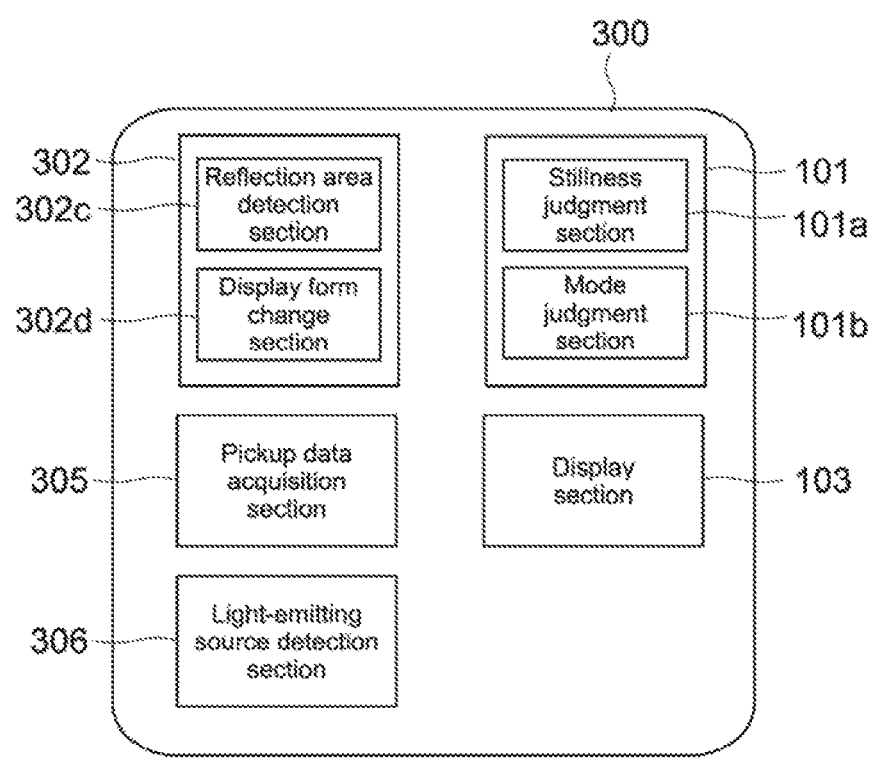
FIG. 12 A block diagram showing a functional structure of an image processing apparatus according to a third embodiment of the present technique.

FIG. 12 is a block diagram showing a functional structure of an image processing apparatus 300 according to a third embodiment of the present technique. The image processing apparatus 300 includes the still position detection section 101, a display control section 302, the display section 103, a pickup data acquisition section 305, and a light-emitting source detection section 306. The still position detection section 101 and the hardware structure of the image processing apparatus 300 are similar to those of the first embodiment, so descriptions thereof will be omitted.

The pickup data acquisition section 305 acquires image data that has captured an area opposing the display area at the still position. The pickup data acquisition section 305 is realized by the controller 11, for example. Specifically, the pickup data acquisition section 305 is capable of acquiring image data captured by the image pickup section 12 at the still position. When the camera lens 121 of the image pickup section 12 is provided in the periphery of the display area, the area opposing the display area can be captured by the image pickup section 12.

Figure 13:
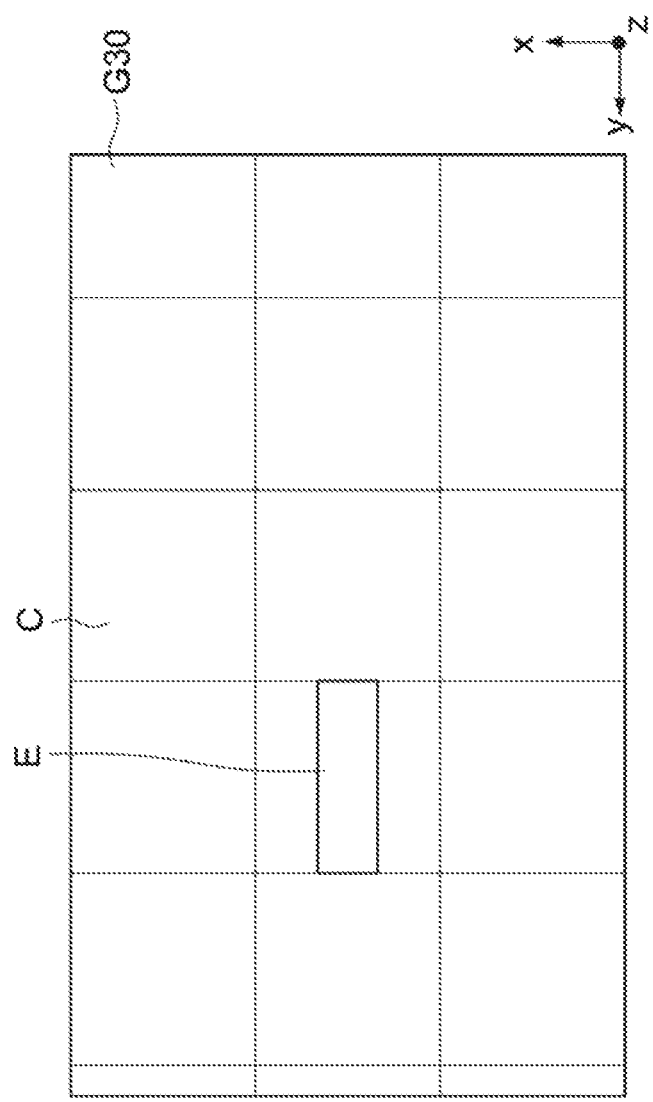
FIG. 13 A diagram schematically showing image data acquired by a pickup data acquisition section of the image processing apparatus.

FIG. 13 is a diagram schematically showing image data G30 acquired by the pickup data acquisition section 305. As shown in the figure, in the image data G30, a ceiling C and a light-emitting source E such as lighting equipment are displayed.

The light-emitting source detection section 306 detects the position of the light-emitting source E in the area opposing the display area D. The light-emitting source detection section 306 is realized by the controller 11, for example.

The light-emitting source detection section 306 is capable of detecting the position of the light-emitting source E within the flat surface of the ceiling based on the image data G30 acquired by the pickup data acquisition section 305, for example. Specifically, the light-emitting source detection section 306 is capable of estimating the position of the light-emitting source E in the image pickup area by recognizing a position having high luminance as the position of the light-emitting source E, based on the luminance distribution of the image data G30. More specifically, the light-emitting source detection section 306 can detect the position of the light-emitting source E by a so-called overexposure detection algorithm. Alternatively, the light-emitting source detection section 306 may analyze features of a subject by an image analysis/recognition technique to detect the position of the light-emitting source E. The position of the light-emitting source E within the flat surface of the ceiling C can be calculated based on the coordinate positions (x, y) of image data in the xy coordinate system defined in the display area, for example. It should be noted that the x- and y-axis directions are biaxial directions orthogonal to each other within the display surface, and the z-axis direction is a direction orthogonal to those directions. The x-axis direction is parallel to the X direction (erecting direction), and the y-axis direction is parallel to the Y-axis direction.

The display control section 302 includes a reflection area detection section 302c and a display form change section 302d.

The reflection area detection section 302c detects a reflection area in the display area, from which reflected light of the light-emitting source is emitted, based on a relationship among the detected position of the light-emitting source, the estimated position of user's eyes at the still position, and the position of the display area.

Figure 14A:
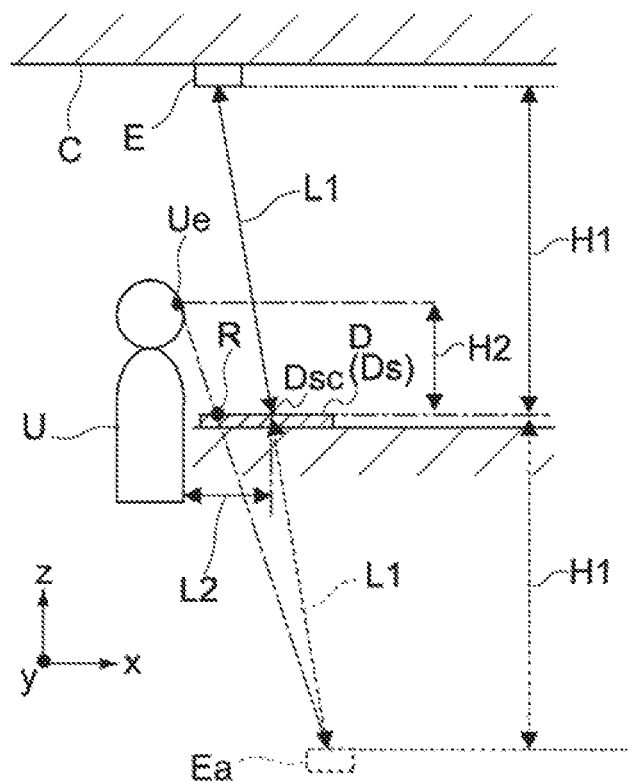
FIG. 14A and FIG. 14B Schematic diagrams for explaining an example of a reflection area detection method by a reflection area detection section of the image processing apparatus.
Figure 14B:
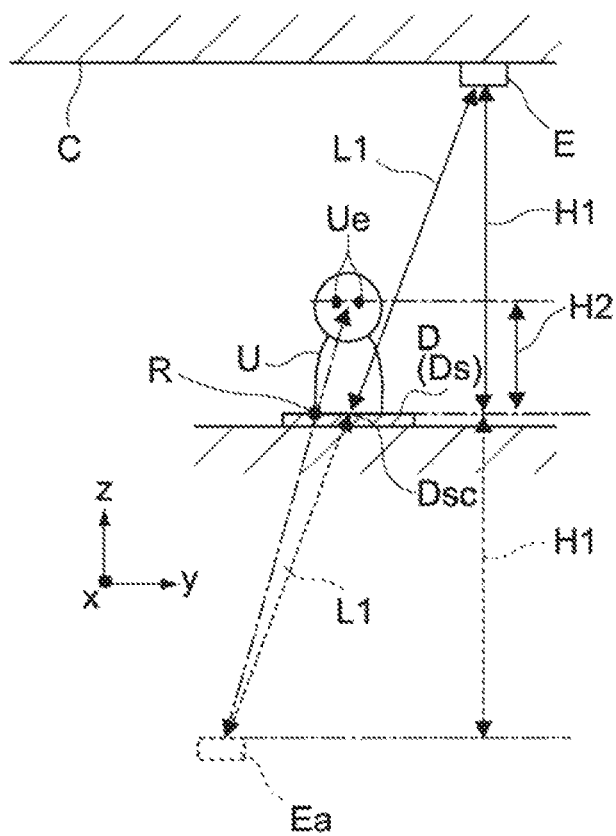

FIGS. 14A and 14B are schematic diagrams for explaining an example of a method of detecting a reflection area R by the reflection area detection section 302c. FIG. 14A is a diagram seen from a side of the user, and FIG. 14B is a diagram seen from the front of the user. As shown in the figures, the reflection area R is an area inside the display area D and is detected as an area on a line connecting a target Ea of the light-emitting source E with respect to the display surface Ds and user's eyes Ue. It should be noted that for explanations, the positional relationship among the light-emitting source E, the display area D, and the user U is illustrated flatly in the figures.

In this case, for obtaining the reflection area R, a distance L1 between a substantial center Dsc of the display surface Ds and the light-emitting source E, a distance L2 between the substantial center of the display area D and the user U, and a height h2 of the user's eyes from the display surface Ds only need to be determined. The distance L1 can be calculated based on a height H1 of the light-emitting source E from the display surface Ds and the position of the light-emitting source E (x, y) in the captured image data. The height H1 of the light-emitting source E from the display surface Ds may be set in advance as an estimate value based on a standard desk height and a standard ceiling height. The distance L2 and the height H2 may also be set in advance as estimate values. Accordingly, the reflection area detection section 302c can calculate the coordinate position of the reflection area in the image data.

The display form change section 302d changes a display form of a reflection image area displayed in the reflection area. More specifically, the display form change section 302d executes processing of moving an object arranged inside the reflection image area to an area outside the reflection image area.

Figure 15A:
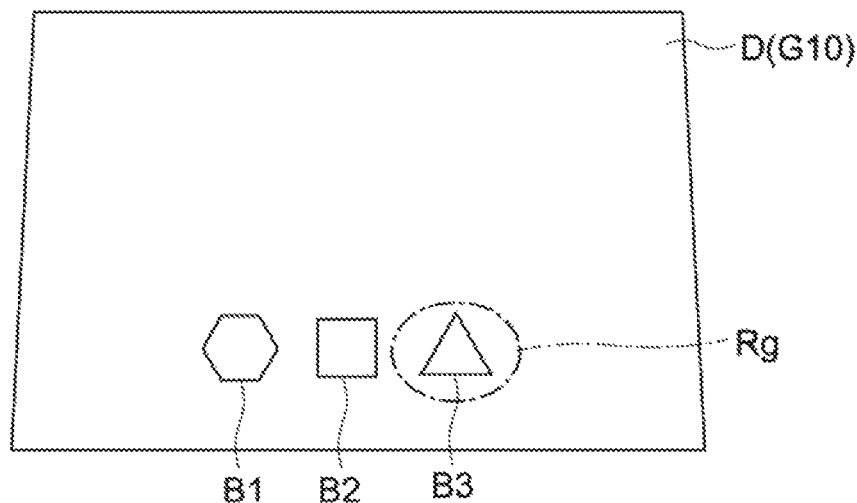
FIGS. 15A and 15B Diagrams for explaining an example of processing carried out by the image processing apparatus, FIG. 15A showing unprocessed image data, and FIG. 15B showing processed image data.
Figure 15B:
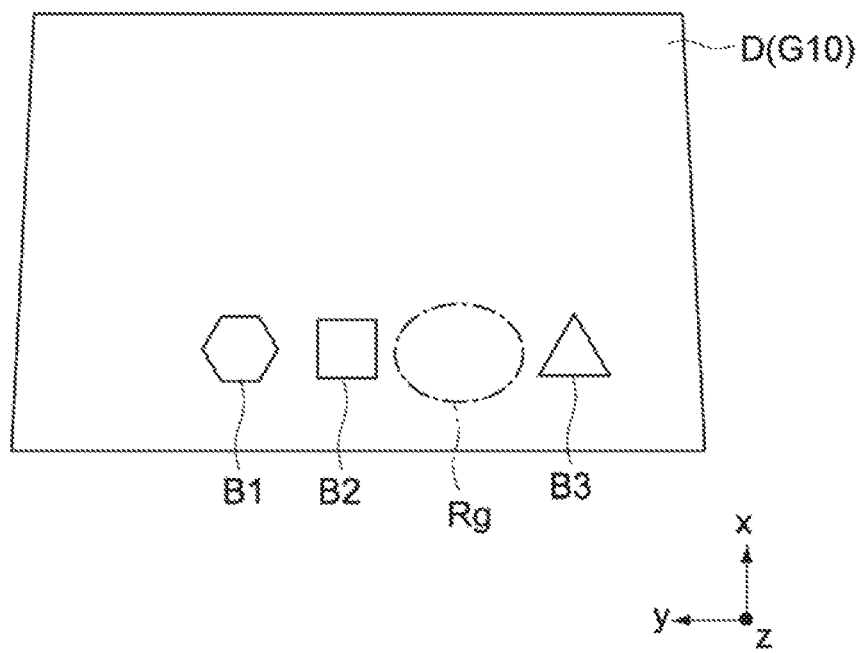

FIGS. 15A and 15B are diagrams for explaining the processing described above, FIG. 15A showing unprocessed image data, and FIG. 15B showing processed image data. As shown in FIG. 15A, in the unprocessed image data, an object B3 out of objects B1, B2, and B3 is arranged inside a reflection image area Rg. As shown in FIG. 15B, the display form change section 302d is capable of obtaining image data subjected to the processing of moving the object B3 to an area outside the reflection image area Rg.

Hereinafter, an operation example of the image processing apparatus 300 having the structure described above will be described.

(Operations of Image Processing Apparatus)

Figure 16:
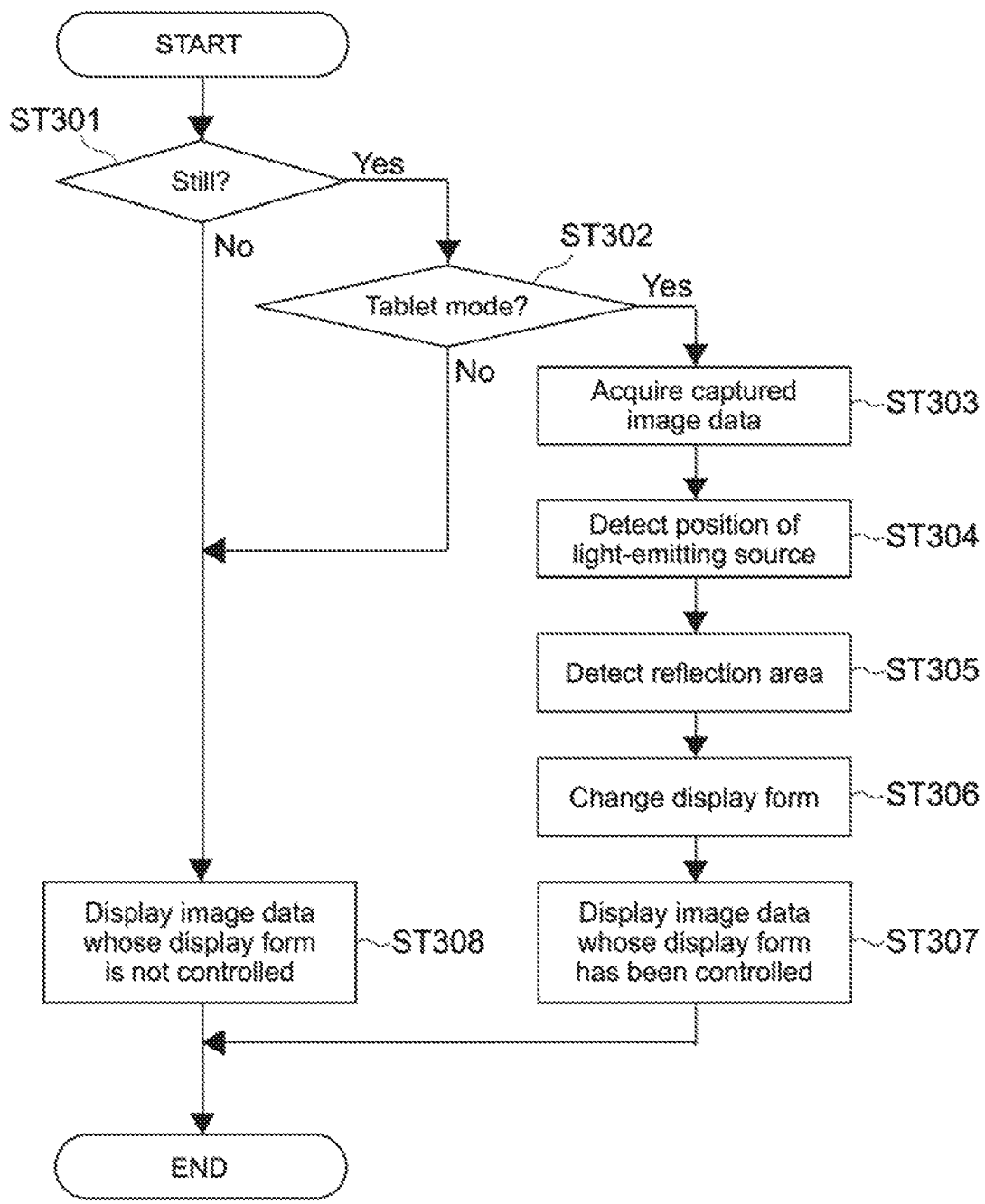
FIG. 16 A flowchart showing operations of the image processing apparatus.

FIG. 16 is a flowchart showing operations of the image processing apparatus 300.

First, the still position detection section 101 detects a still position of the image processing apparatus 300 including the display area D.

Specifically, the stillness judgment section 101a judges whether the image processing apparatus 300 is still based on the output from the motion sensor 181 (ST301). When judged as still (Yes in ST301), the mode judgment section 101b judges whether the image processing apparatus 300 is in the tablet mode (ST302). When judged as being in the tablet mode (Yes in ST302), it is judged that the still position is the horizontal position.

In either case where it is judged as unstill by the stillness judgment section 101a (No in ST301) and it is judged as not being in the tablet mode by the mode judgment section 101b (No in ST302), the display section 103 displays the image data G10 whose display form is not controlled (ST308).

Next, the pickup data acquisition section 305 acquires image data obtained by capturing an area opposing the display area at the still position (ST303). Then, the light-emitting source detection section 306 detects the position of the light-emitting source in the area opposing the display area (ST304) (see FIGS. 14A and 14B).

Subsequently, the reflection area detection section 302c detects a reflection area within the display area, from which reflected light of the light-emitting source is emitted, based on the relationship among the detected position of the light-emitting source, the estimated position of the user's eyes at the still position, and the position of the display area (ST305) (see FIGS. 15A and 15B).

Then, the display form change section 302d changes the display form of the reflection image area displayed in the reflection area. Here, the display form change section 302d executes the processing of moving an object arranged inside the reflection image area to an area outside the reflection image area (ST306).

Finally, the display section 103 displays the image data whose display form has been controlled by the display control section 302 from the display area (ST307).

As described above, according to this embodiment, it is possible to avoid an object from being displayed in an area where a light-emitting source such as lighting equipment is reflected in the display area. As a result, it becomes possible to prevent objects from becoming difficult to be seen.

Modified Example 3-1

The processing of changing the display form by the display form change section 302d is not limited to that described above. For example, the display form change section 302d may execute image quality correction processing on the reflection image area. Specifically, the image quality correction processing may be processing of lowering luminance. As the processing of lowering luminance, at least one of the image processing by software and the control by hardware is applicable as described in the second embodiment.

Modified Example 3-2

The image quality correction processing by the display form change section 302d is not limited to the processing of lowering luminance. For example, the display form change section 302d may execute tone correction processing. As a result, tone of the reflection image area can be corrected to a more-natural tone.

Modified Example 3-3

It is also possible for the image processing apparatus 300 to not include the pickup data acquisition section 305. In other words, the image processing apparatus 300 may include the still position detection section 101, the display control section 302, and the light-emitting source detection section 306.

In this case, the light-emitting source detection section 306 may be capable of detecting the position of the light-emitting source E using the illuminance sensor 182 arranged in the periphery of the display area, and the like. Specifically, a plurality of illuminance sensors 182 are arranged in the periphery of the display area, and the approximate position of the light-emitting source E is detected based on the illuminance distribution detected by the plurality of illuminance sensors 182.

Modified Example 3-4

Figure 17:
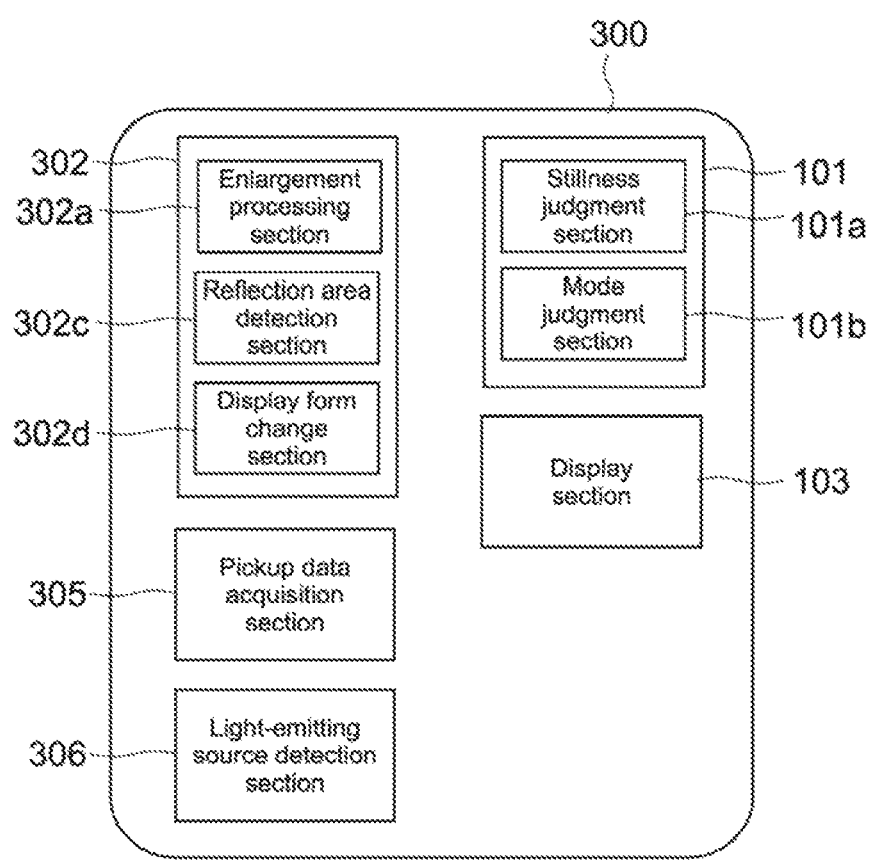
FIG. 17 A block diagram showing a functional structure of the image processing apparatus according to a modified example of the third embodiment.

FIG. 17 is a block diagram showing a functional structure of the image processing apparatus 300 according to this modified example. As shown in the figure, the display control section 302 may include an enlargement processing section 302a in addition to the reflection area detection section 302c and the display form change section 302d.

The enlargement processing section 302a may have a structure similar to that of the enlargement processing section 102a. Specifically, the enlargement processing section 302a executes, on image data, processing of enlarging an object more in the X direction. The enlargement processing section 302a may also execute the trapezoid correction processing of enlarging an upper area of an object in the image data in the X direction, along the Y-axis direction orthogonal to the X direction. Alternatively, when there are a plurality of objects distributed along the X direction, it is possible to execute processing of enlarging, out of the plurality of objects, objects distributed closer to the upper portion of the display area in the X direction more. Alternatively, processing of enlarging objects in the image data more in the X direction, along the X direction may be executed.

Accordingly, it becomes possible to prevent an object from being displayed in the reflection image area due to the light-emitting source such as lighting equipment and display an image in which the second image area, which seems unclear, is enlarged. In addition, an image that seems more clear can be displayed to the user.

It should be noted that in the operations of the image processing apparatus 300, the enlargement processing by the enlargement processing section 302a may be carried out after the detection of a reflection area by the reflection area detection section 302c and the change of a display form by the display form change section 302d. However, the order of the processing is not particularly limited.

Modified Example 3-5

Figure 18:
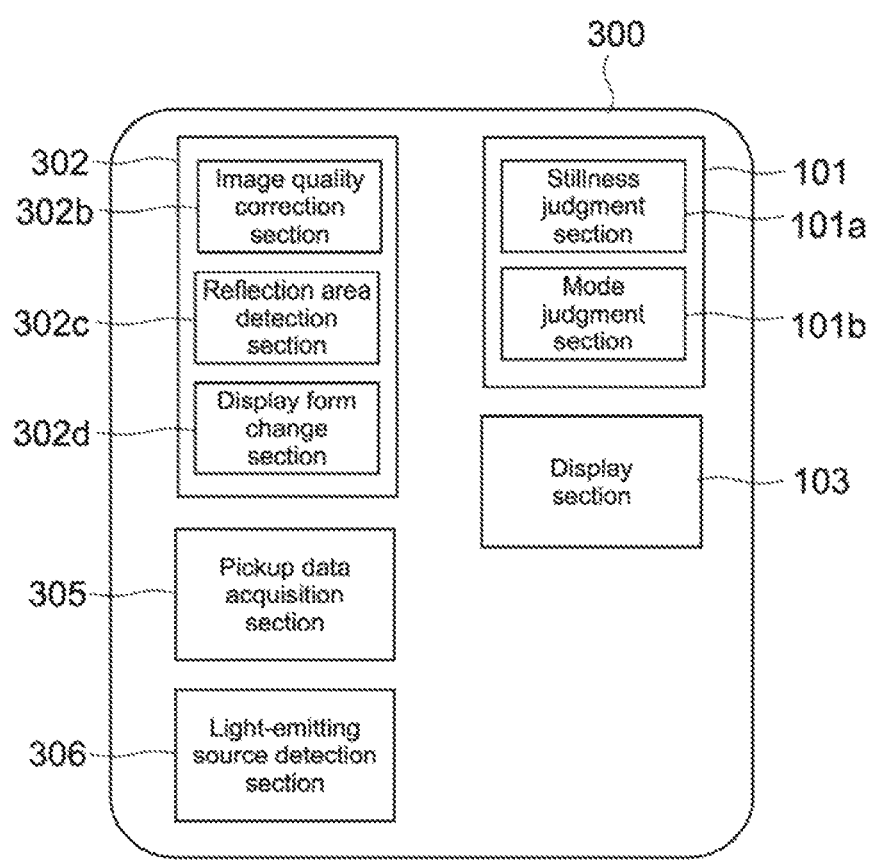
FIG. 18 A block diagram showing a functional structure of the image processing apparatus according to another modified example of the third embodiment.

FIG. 18 is a block diagram showing a functional structure of the image processing apparatus 300 according to this modified example. As shown in the figure, the display control section 302 may include an image quality correction section 302b in addition to the reflection area detection section 302c and the display form change section 302d.

Similar to the image quality correction section 202b, the image quality correction section 302b is capable of correcting the first image area and the second image area to have different image qualities. For example, the image quality correction section 302b is capable of setting the luminance of the second image area to be lower than that of the first image area. Alternatively, the processing of emphasizing edges of the second image area more than those of the first image area may be executed on the image data. Alternatively, the processing of correcting the first image area and the second image area in different tones may be executed on the image data.

Also by this processing, it is possible to display an image that can be easily seen by the user.

It should be noted that in the operations of the image processing apparatus 300, the image quality correction by the image quality correction section 302b may be carried out after the detection of a reflection area by the reflection area detection section 302c and the change of a display form by the display form change section 302d. However, the order of the processing is not particularly limited.

Moreover, in this modified example, the image processing apparatus 300 may include the illuminance detection section 204 described above in addition to the still position detection section 101, the display control section 302, and the display section 103.

Figure 19:
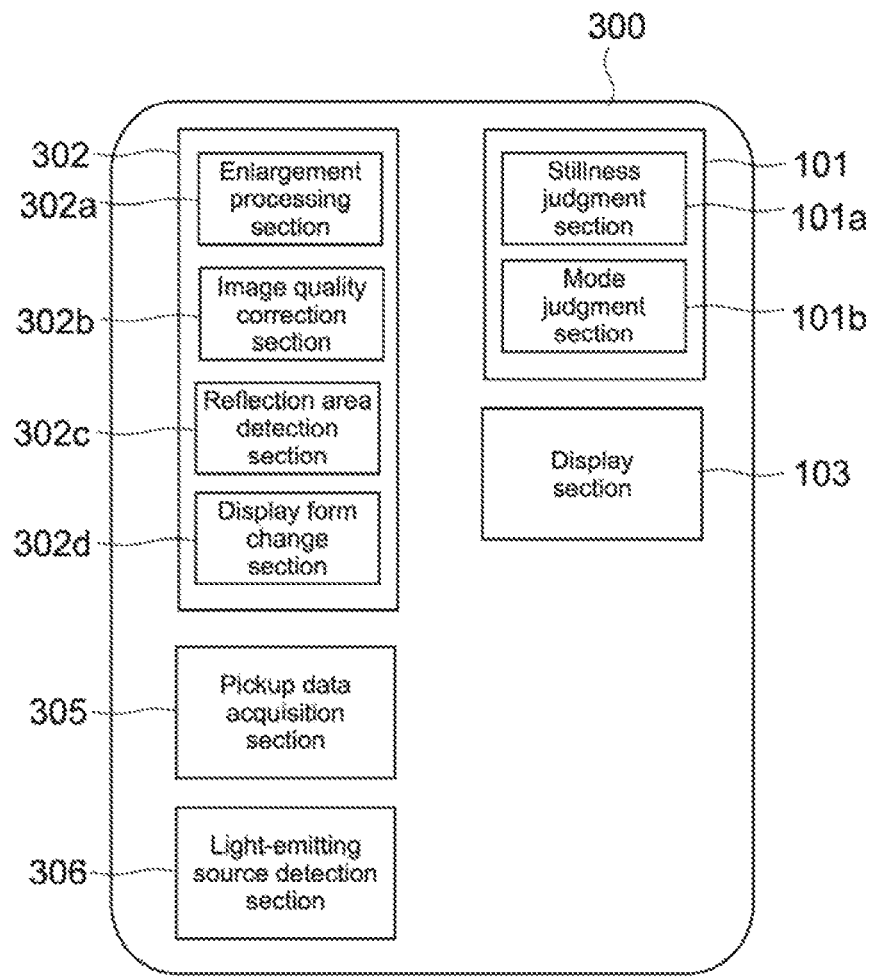
FIG. 19 A block diagram showing a functional structure of the image processing apparatus according to another modified example of the third embodiment.

Further, in this modified example, the display control section 302 may include the enlargement processing section 302a in addition to the reflection area detection section 302c, the display form change section 302d, and the image quality correction section 302b as shown in FIG. 19.

Other Modified Example

In this embodiment, the still position detection section 101 may include the stillness judgment section 101a, the tilt angle detection section 101c, and the tilt angle judgment section 101d as in the modified example 1-3. Alternatively, the still position detection section 101 may include the stillness judgment section 101a, the tilt angle detection section 101c, and the tilt angle judgment section 101d as in the modified example 1-4.

Fourth Embodiment

As in the descriptions below, the image processing described above may be carried out by an image processing system including a plurality of apparatuses.

(Hardware Structure of Image Processing System)

Figure 20:
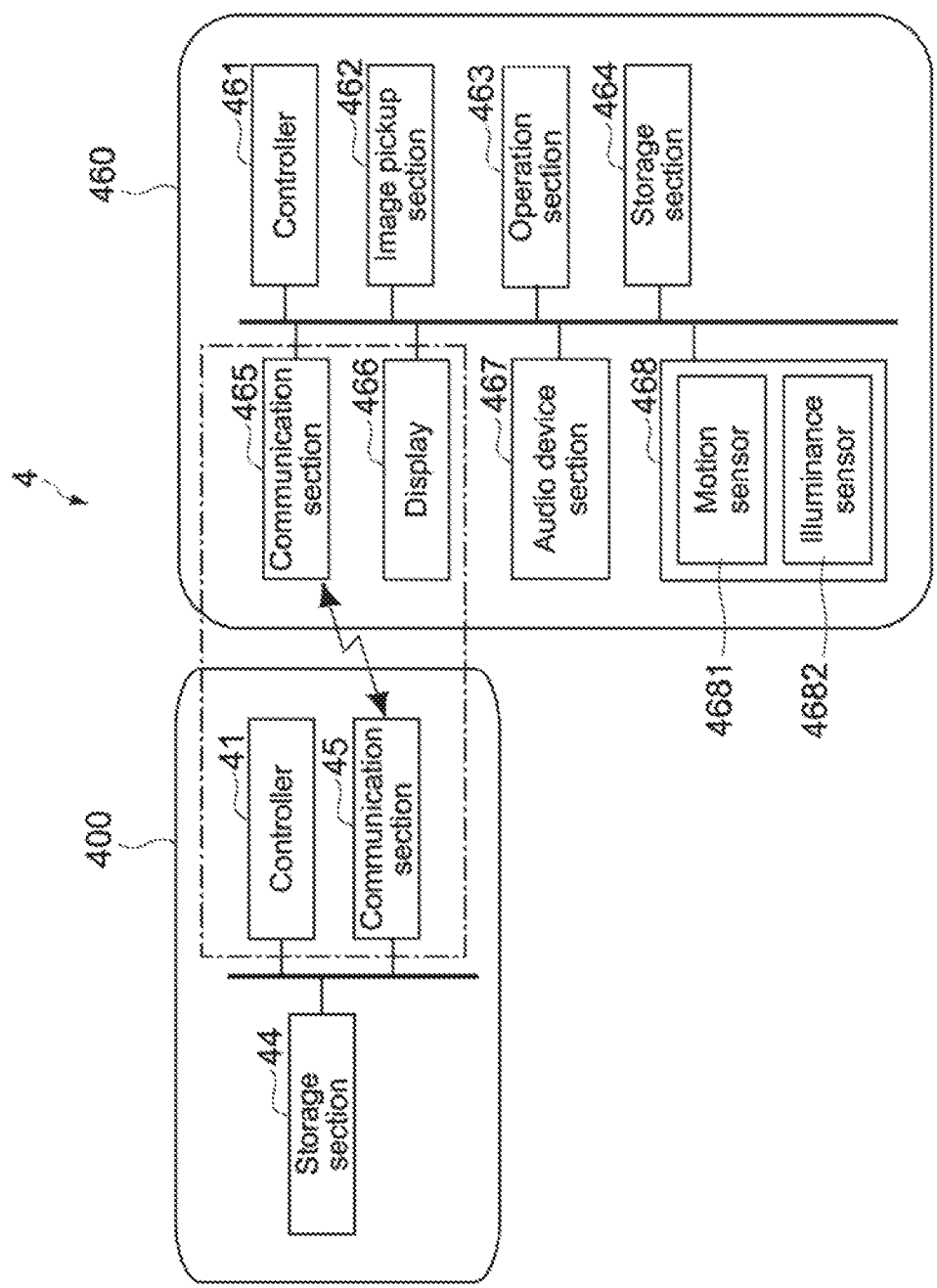
FIG. 20 A block diagram showing a hardware structure of an image processing apparatus according to a fourth embodiment of the present technique.

FIG. 20 is a block diagram showing a hardware structure of an image processing system 4 according to a fourth embodiment of the present technique. The image processing system 4 includes an image processing apparatus 400 and a display apparatus 460 and is capable of displaying image data whose display form has been controlled by the image processing apparatus 400 on the display apparatus 460. The image processing apparatus 400 and the display apparatus 460 are capable of communicating with each other.

The image processing apparatus 400 includes a controller 41, a storage section 44, and a communication section 45. The respective sections are mutually connected via a bus and are capable of transferring data and exchanging control signals. The image processing apparatus 400 is structured as a server apparatus (information processing apparatus) on a network, for example. It should be noted that the image processing apparatus 400 may include an operation section, a display, an audio device section, a sensor section, and the like in addition to the structure described above.

The controller 41 includes a processor such as a CPU and collectively controls the respective sections of the image processing apparatus 400. The controller 41 executes predetermined processing according to control programs stored in a ROM (Read Only Memory) (not shown) or the storage section 44.

The storage section 44 may be constituted of a semiconductor memory such as a flash memory, a recording medium such as a magnetic disk, an optical disc, and a magneto-optical disc, a recording/reproducing mechanism with respect to those recording media, and the like.

The communication section 45 is communicable via a network. The communication section 45 is communicable via a network using a wide area communication system such as LTE, a wireless LAN communication system such as Wi-Fi (registered trademark), a wired LAN communication system, or the like. The communication section 45 may also be capable of being connected to another apparatus by wires via a predetermined terminal.

The display apparatus 460 includes a controller 461, an image pickup section 462, an operation section 463, a storage section 464, a communication section 465, a display 466, an audio device section 467, and a sensor section 468. Those sections are mutually connected via a bus and structured to be capable of transferring data and exchanging control signals. The display apparatus 460 is structured as a user terminal such as a tablet.

The controller 461 includes a processor such as a CPU and collectively controls the respective sections of the image processing apparatus 400. The image pickup section 462 obtains image data from an optical image of a subject. The operation section 463 includes input devices such as a touch panel 431 provided on an upper surface of the display 466 and a keyboard apparatus 432. The storage section 464 is constituted of a semiconductor memory, a recording medium, a recording/reproducing mechanism with respect to those recording media, and the like. The communication section 465 is communicable via a network. The audio device section 467 includes a microphone and a speaker. Similar to the sensor section 18, the sensor section 468 includes a motion sensor 4681 such as an acceleration sensor and an angular velocity sensor and an illuminance sensor 4682.

In the image processing system 4 having the structure as described above, the controller 41 and communication section 45 of the image processing apparatus 400 and the communication section 465 and display 466 of the display apparatus 460 have the functional structures as follows.

(Functional Structure of Image Processing System)

Figure 21:
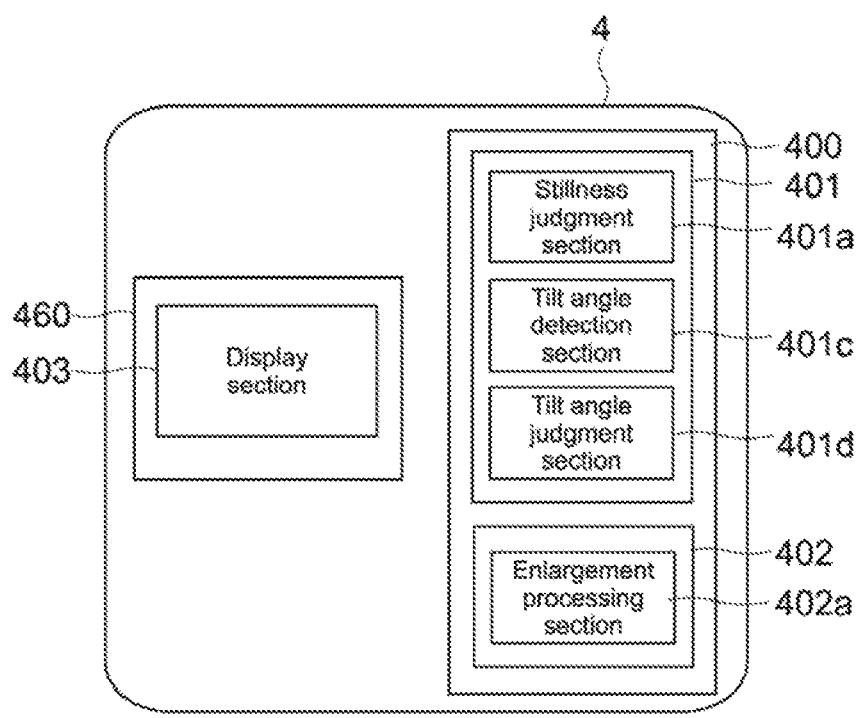
FIG. 21 A block diagram showing a functional structure of the image processing apparatus.

FIG. 21 is a block diagram showing a functional structure of the image processing system 4. As shown in the figure, the image processing system 4 includes a still position detection section 401, a display control section 402, and a display section 403. Of those, the image processing apparatus 400 includes the still position detection section 401 and the display control section 402. The display apparatus 460 includes the display section 403.

Similar to the still position detection section 101, the still position detection section 401 detects a still position of a terminal including a display area (display apparatus 460). The still position detection section 401 is realized by the controller 41, for example. The still position detection section 401 includes a stillness judgment section 401a, for example.

Based on the output from the motion sensor 4681, the stillness judgment section 401a judges whether the display apparatus 460 is still. In the case where the display apparatus 460 is a tablet, it is presumed that the user operates the display apparatus 460 while either holding it or placing it on a desk, knees, or the like. Therefore, when judged as still, the still position detection section 401 judges that the still position is the horizontal position.

Based on the still position, the display control section 402 controls a display form of image data displayable from the display area. The display control section 402 is realized by the controller 41, for example. The display control section 402 is also capable of changing the display form between the first image area occupying a lower portion of the image data in the X direction and the second image area occupying an upper portion of the image data in the X direction. The display control section 402 may also be structured to be capable of controlling the display form of image data when judged that the still position is the horizontal position.

The display control section 402 includes an enlargement processing section 402a that executes, on image data, processing of enlarging an object more in the X direction. The enlargement processing section 402a may also execute the trapezoid correction processing of enlarging an upper area of an object in the image data in the X direction, along the Y-axis direction (uniaxial direction) orthogonal to the X direction.

Alternatively, the enlargement processing section 402a may execute processing of enlarging, out of a plurality of objects distributed in the X direction in the data, objects distributed closer to the upper portion in the X direction more. Alternatively, the enlargement processing section 402a may execute processing of enlarging objects in the image data more in the X direction, along the X direction.

The display section 403 displays the image data whose display form has been controlled by the display control section 402 from the display area of the display apparatus 460. The display section 403 is realized by the display 466, for example.

Also in the image processing system 4 having the structure as described above, operations similar to those of the image processing apparatus 100 can be carried out. In other words, the image processing apparatus 400 can display, on the display apparatus 460, image data that can be seen clearly even at a still position where it is difficult for the user using the display apparatus 460 to see the second image area.

Modified Example 4-1

Referring back to FIG. 8, the display control section 402 may include an image quality correction section capable of correcting the first image area and the second image area in different image qualities. The image quality correction section may have a structure similar to that of the image quality correction section 202b. As a result, an image that can be seen clearly can be displayed to the user.

It should be noted that in this case, the image processing apparatus 400 may include an illuminance detection section similar to the illuminance detection section 204 in addition to the still position detection section 401 and the display control section 402. Accordingly, the image quality correction section can correct image qualities based on the illuminance information detected by the illuminance detection section.

Modified Example 4-2

Referring back to FIG. 12, the image processing apparatus 400 may include a pickup data acquisition section and a light-emitting source detection section in addition to the still position detection section 401 and the display control section 402.

Similar to the pickup data acquisition section 305, the pickup data acquisition section acquires image data obtained by capturing an area opposing the display area at the still position. In this case, the pickup data acquisition section is realized by the controller 41, for example. The captured image data may be captured by the image pickup section 462 of the display apparatus 460.

Similar to the light-emitting source detection section 306, the light-emitting source detection section detects a position of the light-emitting source in the area opposing the display area. The light-emitting source detection section is capable of detecting a position of the light-emitting source within the flat surface of a ceiling based on the image data acquired by the pickup data acquisition section, for example.

In this modified example, the display control section 402 may include a reflection area detection section and a display form change section. Similar to the reflection area detection section 302c, the reflection area detection section detects a reflection area in the display area, from which reflected light of the light-emitting source is emitted, based on a relationship among the detected position of the light-emitting source, the estimated position of user's eyes at the still position, and the position of the display area. Similar to the display form change section 302d, the display form change section changes a display form of the reflection image area displayed in the reflection area. The display form change section may also execute processing of moving an object arranged inside the reflection image area to an area outside the reflection image area or execute image quality correction processing on the reflection image area.

Also in the image processing system 4 according to the modified example 4-2, operations similar to those of the image processing apparatus 300 can be carried out.

Modified Example 4-3

In this embodiment, as in the modified examples 1-3 and 1-4, the still position detection section 401 may include the stillness judgment section 101a, the tilt angle detection section, and the tilt angle judgment section.

The embodiments of the present technique have been described heretofore. However, the present technique is not limited to the embodiments above and can be variously modified without departing from the gist of the present technique.

For example, the "terminal including a display area" may be a tablet, a smartphone, a laptop PC, an electronic book reader, a game apparatus, or other terminals in addition to a tablet PC. In such a case, as described above in the fourth embodiment, the still position detection section can judge whether the terminal is at the horizontal position based on the stillness judgment by the stillness judgment section even without the mode judgment section. Alternatively, as described above in the modified example 4-3, the still position can be detected by the still position detection section including the tilt angle detection section and the tilt angle judgment section. It should be noted that the still position detection section can detect a position of a portion at which the display area is provided (display unit etc.) in the terminal.

The image data whose display form is controlled by the display control section may be 3D image data. In this case, depending on the still position, the user may feel that a sense of depth and stereoscopic effect of the displayed image data are unnatural. In this regard, the display control section is capable of executing processing of changing depths of layers, shadowing, and the like based on the still position detected by the still position detection section. As a result, image data having a natural sense of depth and stereoscopic effect can be displayed.

It should be noted that the present technique may also take the following structures.

(1) An image processing apparatus, including:
a still position detection section that detects a still position of a terminal including a display area; and
a display control section that controls a display form of image data that can be displayed from the display area based on the still position.

(2) The image processing apparatus according to (1) above, in which
the still position detection section judges whether the still position is a horizontal position, and
the display control section controls the display form of image data when judged that the still position is a horizontal position.

(3) The image processing apparatus according to (1) or (2) above,
in which the display control section changes the display form between a first image area that occupies a lower portion of the image data in an erecting direction and a second display area that occupies an upper portion of the image data in the erecting direction.

(4) The image processing apparatus according to (3) above,
in which the display control section includes an enlargement processing section that executes, on the image data, processing of enlarging more in the erecting direction.

(5) The image processing apparatus according to (4) above,
in which the enlargement processing section executes trapezoid correction processing of enlarging an upper area of an object in the image data in the erecting direction, along a uniaxial direction orthogonal to the erecting direction.

(6) The image processing apparatus according to (4) above, in which
the image data includes a plurality of objects distributed in the erecting direction, and
the enlargement processing section executes processing of enlarging, out of the plurality of objects distributed in the erecting direction in the image data, objects displayed closer to the upper portion in the erecting direction more.

(7) The image processing apparatus according to (4) above,
in which the enlargement processing section executes processing of enlarging an object in the image data along the erecting direction such that the object is enlarged more along the erecting direction.

(8) The image processing apparatus according to any one of (3) to (7) above,
in which the display control section includes an image quality correction section capable of correcting the first image area and the second image area to have different image qualities.

(9) The image processing apparatus according to (8) above,
in which the image quality correction section sets luminance of the second image area to be lower than that of the first image area.

(10) The image processing apparatus according to (8) or (9) above,
in which the image quality correction section executes, on the image data, processing of emphasizing edges of the second image area more than those of the first image area.

(11) The image processing apparatus according to any one of (8) to (10) above,
in which the image quality correction section executes, on the image data, processing of correcting the first image area and the second image area in different tones.

(12) The image processing apparatus according to any one of (8) to (11) above, further including an illuminance detection section that detects illuminance information in a periphery of the display area, in which the image quality correction section corrects the image quality based on the detected illuminance information.

(13) The image processing apparatus according to any one of (1) to (12) above, further including a light-emitting source detection section that detects a position of a light-emitting source in an area opposing the display area, in which the display control section includes a reflection area detection section that detects a reflection area in the display area from which reflected light of the light-emitting source is emitted, based on a relationship among the detected position of the light-emitting source, an estimated position of user's eyes at the still position, and a position of the display area, and a display form change section that changes a display form of a reflection image area displayed in the reflection area.

(14) The image processing apparatus according to (13) above, further including a pickup data acquisition section that acquires image data of an area opposing the display area, that has been captured at the still position, in which the light-emitting source detection section detects the position of the light-emitting source based on the acquired image data.

(15) The image processing apparatus according to (13) or (14) above, in which the display form change section executes processing of moving an object arranged inside the reflection image area to an area outside the reflection image area.

(16) The image processing apparatus according to any one of (13) to (15) above, in which the display form change section executes image quality correction processing on the reflection image area.

(17) The image processing apparatus according to (16) above, in which the image quality correction processing is processing of lowering luminance.

(18) The image processing apparatus according to any one of (1) to (17) above, further including a display section that displays the image data from the display area.

(19) An image processing method, including:

detecting a still position of a terminal including a display area; and controlling a display form of image data that can be displayed from the display area based on the still position.

(20) A program that causes an information processing apparatus to function as:

a still position detection section that detects a still position of a terminal including a display area; and a display control section that controls a display form of image data that can be displayed from the display area based on the still position.

DESCRIPTION OF SYMBOLS 100, 200, 300, 400 image processing apparatus
101, 401 still position detection section
102, 202, 302, 402 display control section
102a, 202a, 302a enlargement processing section
202b, 302b image quality correction section
302c reflection area detection section
302d display form change section
103 display section
204 illuminance detection section
305 pickup data acquisition section
306 light-emitting source detection section

The invention claimed is:

1. An image processing apparatus, comprising:
a terminal that includes a display section, wherein the terminal is switchable between a tablet mode and a personal computer (PC) mode;
a still position detection section configured to:
detect a still position of the terminal; and
determine a tilt angle of a horizontal surface of the display section with respect to a specific tilt angle based on output from a sensor;
determine that a mode of the terminal is the tablet mode based on a connection state of the display section with a keyboard section;
determine whether the still position is a horizontal position based on the determined tilt angle and the determination that the mode of the terminal is the tablet mode; and
a display control section configured to:
enlarge, among a first image area that occupies a lower portion of image data in an erecting direction and a second image area that occupies an upper portion of the image data in the erecting direction, a display form of the upper portion of the image data based on the determination that the still position is the horizontal position; and
control the display section to display the image data that has the enlarged display form.

2. The image processing apparatus according to claim 1, wherein
the display control section is further configured to reduce the first image area that occupies the lower portion of the image data based on the determination that the still position is the horizontal position, and
the lower portion is at a position lower than the upper portion in the erecting direction.

3. The image processing apparatus according to claim 2, wherein
the display control section includes an enlargement processing section configured to execute trapezoid correction processing on the image data, and
the trapezoid correction processing comprises enlargement of an upper area of an object in the image data in the erecting direction, along a uniaxial direction orthogonal to the erecting direction.

4. The image processing apparatus according to claim 2, wherein
the image data includes a plurality of objects distributed in the erecting direction,
the display control section includes an enlargement processing section configured to enlarge a first object of the plurality of objects and a second object of the plurality of objects,
the enlargement of the second object is more than the enlargement of the first object, and
the second object is closer to the upper portion than the first object.

5. The image processing apparatus according to claim 2, wherein the display control section includes an enlargement processing section configured to enlarge an object in the image data along the erecting direction such that the enlargement of the object increases along the erecting direction.

6. The image processing apparatus according to claim 1, wherein the horizontal position is a position of the terminal on one of a surface of a desk, floor, or user knees.

7. The image processing apparatus according to claim 1, wherein the still position detection section is further configured to detect the still position of the terminal based on output of a motion sensor associated with the terminal.

8. An image processing method, comprising:
   detecting a still position of a terminal, wherein
      the terminal includes a display section, and
      the terminal is switchable between a tablet mode and a personal computer (PC) mode;
   determining a tilt angle of a horizontal surface of the display section with respect to a specific tilt angle based on output from a sensor;
   determining that a mode of the terminal is the tablet mode based on a connection state of the display section with a keyboard section;
   determining whether the still position is a horizontal position based on the determined tilt angle and the determination that the mode of the terminal is the tablet mode;
   enlarging, among a first image area that occupies a lower portion of image data in an erecting direction and a second image area that occupies an upper portion of the image data in the erecting direction, a display form of the upper portion of the image data based on the determination that the still position is the horizontal position; and
   controlling the display section to display the image data that has the enlarged display form.

9. A non-transitory computer-readable medium having stored thereon computer-executable instructions that, when executed by a processor, cause the processor to execute operations, the operations comprising:
   detecting a still position of a terminal, wherein
      the terminal includes a display section, and
      the terminal is switchable between a tablet mode and a personal computer (PC) mode;
   determining a tilt angle of a horizontal surface of the display section with respect to a specific tilt angle based on output from a sensor;
   determining that a mode of the terminal is the tablet mode based on a connection state of the display section with a keyboard section;
   determining whether the still position is a horizontal position based on the determined tilt angle and the determination that the mode of the terminal is the tablet mode;
   enlarging, among a first image area that occupies a lower portion of image data in an erecting direction and a second image area that occupies an upper portion of the image data in the erecting direction, a display form of the upper portion of the image data based on the determination that the still position is the horizontal position; and
   controlling the display section to display the image data that has the enlarged display form.

* * * * *